United States Patent
Toda

[11] Patent Number: 5,852,261
[45] Date of Patent: Dec. 22, 1998

[54] SURFACE ACOUSTIC WAVE TOUCH-POSITION SENSING DEVICE

[76] Inventor: Kohji Toda, 1-49-18 Futaba, Yokosuka 239, Japan

[21] Appl. No.: 694,983

[22] Filed: Aug. 9, 1996

[51] Int. Cl.⁶ .............................. G08C 21/00; G09G 5/00
[52] U.S. Cl. .................................... 178/18.04; 178/19.02; 345/177
[58] Field of Search ................................. 178/18, 19, 20, 178/18.01, 18.04, 19.02; 345/173, 176, 177; 367/907

[56] References Cited

U.S. PATENT DOCUMENTS

| | | | |
|---|---|---|---|
| 4,587,565 | 5/1986 | Eden | 358/235 |
| 5,134,689 | 7/1992 | Murakami et al. | 345/177 |
| 5,260,521 | 11/1993 | Knowles | 178/18 |
| 5,260,913 | 11/1993 | Kadota et al. | 367/140 |
| 5,638,093 | 6/1997 | Takahashi et al. | 345/173 |

Primary Examiner—Vijay Shankar

[57] ABSTRACT

A surface acoustic wave touch-position sensing device comprising at least two surface acoustic wave-transducing units X and Y having N propagation lanes $U_{Xi}$ (i=1, 2, ..., N) and $U_{Yi}$ (i=1, 2, ..., N), respectively, a nonpiezoelectric plate, and a controlling system connected with the units X and Y. Each unit includes a piezoelectric substrate $P_T$, a piezoelectric substrate $P_R$, at least an input interdigital transducer formed on one end surface of the piezoelectric substrate $P_T$, and at least an output interdigital transducer formed on one end surface of the piezoelectric substrate $P_R$. The piezoelectric substrates $P_T$ and $P_R$ are mounted on an upper end surface of the nonpiezoelectric plate. When an electric signal $E_T$ is applied to the input interdigital transducer, a surface acoustic wave is excited in the piezoelectric substrate $P_T$. The surface acoustic wave is transmitted to the piezoelectric substrate $P_R$ through the upper end surface of the nonpiezoelectric plate, and is transduced to an electric signal $E_R$. If touching a crossing point of the lanes $U_{Xi}$ and $U_{Yi}$ on the upper end surface of the nonpiezoelectric plate, the surface acoustic wave is intercepted at the crossing point. Therefore, the magnitude of the electric signal $E_R$ corresponding to the crossing point decrease or disappearance. Thus, it is possible to specify the crossing point.

17 Claims, 17 Drawing Sheets

SURFACE ACOUSTIC WAVE TOUCH-POSITION SENSING DEVICE

BACKGROUND OF THE INVENTION

1. Field of the Invention

The present invention relates to a surface acoustic wave device for sensing a touch-position on a nonpiezoelectric plate having at least two surface acoustic wave transducing units.

2. Description of the Prior Art

A resistance-film form of conventional touch panels has an electrically conductive transparent film, the magnitude of the resistance thereof changing when touching thereon. The resistance-film form of conventional touch panels is operated under low power consumption, however has some problems on response time, sensitivity, durability and others. An ultrasonic form of conventional touch panels has a nonpiezoelectric plate under acoustic vibration, which is decreased or disappeared when touching on the nonpiezoelectric plate. Conventional methods for exciting the acoustic vibration on a nonpiezoelectric plate generally include a wedge-shaped transducer with a bulk wave vibrator for vibrating a nonpiezoelectric plate indirectly, or a piezoelectric thin film transducer for vibrating a nonpiezoelectric plate directly. The wedge-shaped transducer is mainly used for a non-destruction evaluation by ultrasound under a comparative low frequency operation alone because of the difficulty on manufacturing accuracy of the wedge angle and so on. The piezoelectric thin film transducer consists of a nonpiezoelectric plate, a piezoelectric thin film mounted on the nonpiezoelectric plate and made from ZnO and others, and interdigital transducers exciting the acoustic vibration on the nonpiezoelectric plate. Because of various transmission characteristics of the interdigital transducers with various structures, the piezoelectric thin film transducer is used as a high frequency device, however has operation frequencies limited to the UHF and VHF bands, and has some problems on manufacturing and mass production.

Thus, there are some problems on response time, sensitivity, durability, manufacturing, mass production, difficulty in use, operation frequencies, and high voltage operation with high power consumption in conventional touch panels.

SUMMARY OF THE INVENTION

An object of the present invention is to provide a surface acoustic wave touch-position sensing device capable of specifying a touch-position on the nonpiezoelectric plate with a finger or others with a high sensitivity and a quick response time.

Another object of the present invention is to provide a surface acoustic wave touch-position sensing device excellent in durability, manufacturing, mass-production.

Another object of the present invention is to provide a surface acoustic wave touch-position sensing device being easy to support the piezoelectric plate or the nonpiezoelectric plate.

Another object of the present invention is to provide a surface acoustic wave touch-position sensing device being easy to use.

A still other object of the present invention is to provide a surface acoustic wave touch-position sensing device operating under low power consumption with low voltage.

A still further object of the present invention is to provide a surface acoustic wave touch-position sensing device with a small size which is very light in weight and has a simple structure.

According to one aspect of the present invention there is provided a surface acoustic wave touch-position sensing device comprising at least two surface acoustic wave transducing units X and Y, a nonpiezoelectric plate, and a controlling system connected with the surface acoustic wave transducing units X and Y. Each surface acoustic wave transducing unit consists of a piezoelectric substrate $P_T$, a piezoelectric substrate $P_R$, N interdigital transducers $I_{Ti}$ (i=1, 2, . . . , N) formed on one end surface of the piezoelectric substrate $P_T$, an interdigital transducer $I_R$ formed on one end surface of the piezoelectric substrate $P_R$, and N switches $C_i$ (i=1, 2, . . . , N).

The thickness d of the piezoelectric substrate $P_T$ is smaller than an interdigital periodicity p of the interdigital transducer $I_{Ti}$. The interdigital transducer $I_R$ has an interdigital periodicity equal to the interdigital periodicity p. The thickness d of the piezoelectric substrate $P_R$ is smaller than the interdigital periodicity p. The piezoelectric substrates $P_T$ and $P_R$ are mounted on an upper end surface of the nonpiezoelectric plate. The thickness of the nonpiezoelectric plate is larger than three times the interdigital periodicity p. An output terminal of each switch $C_i$ is connected with an input terminal of each of the interdigital transducers $I_{Ti}$.

The interdigital transducer $I_{Ti}$ receives an electric signal $E_T$ with a frequency approximately corresponding to the interdigital periodicity p, and excites the surface acoustic wave of the first mode and the higher order modes in the piezoelectric substrate $P_T$. The surface acoustic wave having the wavelength approximately equal to the interdigital periodicity p is transmitted to the piezoelectric substrate $P_R$ through the upper end surface of nonpiezoelectric plate. In this time, the phase velocity of the surface acoustic wave of the first mode and the higher order modes is approximately equal to the phase velocity of the Rayleigh wave traveling on the nonpiezoelectric plate alone.

The interdigital transducer $I_R$ transduces the surface acoustic wave in the piezoelectric substrate $P_R$ to an electric signal $E_R$ with a frequency approximately corresponding to the interdigital periodicity p.

The nonpiezoelectric plate is made of a material such that the phase velocity of the surface acoustic wave traveling on the nonpiezoelectric plate alone is higher than that traveling on the piezoelectric substrates $P_T$ and $P_R$ alone.

The controlling system turns on and off the switches $C_i$ with a fixed period in turn, keeps a check on a magnitude of the electric signal $E_R$, senses a touch with a finger or others on the upper end surface of the nonpiezoelectric plate by a decrease or a disappearance in magnitude of the electric signal $E_R$, and picks out one of the switches $C_i$ turned on when the decrease or the disappearance in magnitude of the electric signal $E_R$ happens.

The surface acoustic wave transducing unit X has N propagation lanes $U_{Xi}$ (i=1, 2, . . . , N) of the surface acoustic wave between the interdigital transducers $I_{Ti}$ and $I_R$, two neighbors of the propagation lanes $U_{Xi}$ being closed or partially overlapping each other.

The surface acoustic wave transducing unit Y has N propagation lanes $U_{Yi}$ (i=1, 2, . . . , N) of the surface acoustic wave between the interdigital transducers $I_{Ti}$ and $I_R$, two neighbors of the propagation lanes $U_{Yi}$ being closed or partially overlapping each other, the propagation lane $U_{Xi}$ being vertical to the propagation lane $U_{Yi}$.

According to another aspect of the present invention there are provided two amplifiers $A_X$ and $A_Y$. An input terminal of the switch $C_i$ in the surface acoustic wave transducing unit Y is connected with an output terminal of the interdigital transducer $I_R$ in the surface acoustic wave transducing unit X via the amplifier $A_X$. An input terminal of the switch $C_i$ in the surface acoustic wave transducing unit X is connected with an output terminal of the interdigital transducer $I_R$ in the surface acoustic wave transducing unit Y via the amplifier $A_Y$. The switches $C_i$ in the surface acoustic wave transducing unit X, the propagation lanes $U_{Xi}$ as delay elements, the amplifier $A_X$, the switches $C_i$ in the surface acoustic wave transducing unit Y, the propagation lanes $U_{Yi}$ as delay elements, and the amplifier $A_Y$ form N oscillators $H_i$ (i=1, 2, ..., N).

According to another aspect of the present invention there is provided a supporting board cemented to the lower end surface of the nonpiezoelectric plate.

According to another aspect of the present invention there is provided a piezoelectric substrate made of a piezoelectric ceramic, the polarization axis thereof being parallel to the thickness direction thereof.

According to another aspect of the present invention there is provided a piezoelectric substrate made of a piezoelectric polymer such as PVDF and so on.

According to another aspect of the present invention there is provided a surface acoustic wave touch-position sensing device comprising at least two surface acoustic wave transducing units X and Y, a nonpiezoelectric plate, and a controlling system connected with the surface acoustic wave transducing units X and Y. Each surface acoustic wave transducing unit consists of a piezoelectric substrate $P_T$, a piezoelectric substrate $P_R$, N interdigital transducers $T_i$ (i=1, 2, ..., N), an interdigital transducer R, N earth electrodes $G_{Ti}$ (i=1, 2, ..., N), an earth electrode $G_R$, a phase shifter $S_T$ including at least a coil $L_1$, a phase shifter $S_R$ including at least a coil $L_2$, and N pairs of switches $W_i$ (i=1, 2, ..., N).

The interdigital transducers $T_i$ and the earth electrodes $G_{Ti}$ are formed on an upper- and a lower end surfaces of the piezoelectric substrate $P_T$, respectively. Each interdigital transducer $T_i$ consists of two electrodes $T_{i-1}$ and $T_{i-2}$, and has two kinds of distances between one electrode finger of the electrode $T_{i-1}$ and two neighboring electrode fingers of the electrode $T_{i-2}$. The interdigital transducer R and the earth electrode $G_R$ are formed on an upper- and a lower end surfaces of the piezoelectric substrate $P_R$, respectively. The interdigital transducer R consists of two electrodes $R_{-1}$ and $R_{-2}$, and has two kinds of distances between one electrode finger of the electrode $R_{-1}$ and two neighboring electrode fingers of the electrode $R_{-2}$. The piezoelectric substrates $P_T$ and $P_R$ are mounted on the upper end surface of the nonpiezoelectric plate through the earth electrodes $G_{Ti}$ and $G_R$, respectively. Each pair of switches $W_i$ consists of two switches $W_{i-1}$ and $W_{i-2}$, output terminals of the switches $W_{i-1}$ and $W_{i-2}$ being connected with input terminals of the electrodes $T_{i-1}$ and $T_{i-2}$, respectively.

The interdigital transducer $T_i$ and the earth electrode $G_{Ti}$ receive an electric signal $E_{Ti}$ between the electrode $T_{i-1}$ and the earth electrode $G_{Ti}$, and an electric signal $E_{T2}$ between the electrode $T_{i-2}$ and the earth electrode $G_{Ti}$ via the phase shifter $S_T$, and excite a surface acoustic wave of the first mode and the higher order modes in the piezoelectric substrate $P_T$. The surface acoustic wave is transmitted to the piezoelectric substrate $P_R$ through the upper end surface of the nonpiezoelectric plate, the phase difference between the electric signals $E_{T1}$ and $E_{T2}$ being $2\pi y$. In this time, $x<\frac{1}{2}$ in a shorter distance xp of the two kinds of distances between one electrode finger of the electrode $T_{i-1}$ and two neighboring electrode fingers of the electrode $T_{i-2}$, and $x+y=\pm\frac{1}{2}$ in the phase difference $2\pi y$ between the electric signals $E_{T1}$ and $E_{T2}$.

The interdigital transducer R and the earth electrode $G_R$ transduce the surface acoustic wave to an electric signal $E_{R1}$ between the electrode $R_{-1}$ and the earth electrode $G_R$, and an electric signal $E_{R2}$ between the electrode $R_{-2}$ and the earth electrode $G_R$, the phase difference between the electric signals $E_{R1}$ and $E_{R2}$ being $2\pi y$. In this time, $x<\frac{1}{2}$ in a shorter distance xp of the two kinds of distances between one electrode finger of the electrode $R_{-1}$ and two neighboring electrode fingers of the electrode $R_{-2}$, and $x+y=\pm\frac{1}{2}$ in the phase difference $2\pi y$ between the electric signals $E_{R1}$ and $E_{R2}$. The phase shifter $S_R$ combines the electric signals $E_{R1}$ and $E_{R2}$, and delivers a combined electric signal $E_R$.

The controlling system turns on and off the pairs of switches $W_i$ with a fixed period in turn, keeps a check on a magnitude of the electric signal $E_R$, senses a touch with a finger or others on the upper end surface of the nonpiezoelectric plate by a decrease or a disappearance in magnitude of the electric signal $E_R$, picks out the pair of switches $W_i$ turned on when the decrease or the disappearance in magnitude of the electric signal $E_R$ happens.

According to another aspect of the present invention there are provided two amplifiers $A_X$ and $A_Y$. An input terminal of the phase shifter $S_T$ in the surface acoustic wave transducing unit Y is connected with an output terminal of the phase shifter $S_R$ in the surface acoustic wave transducing unit X via the amplifier $A_X$. An input terminal of the phase shifter $S_T$ in the surface acoustic wave transducing unit X is connected with an output terminal of the phase shifter $S_R$ in the surface acoustic wave transducing unit Y via the amplifier $A_Y$. The phase shifter $S_T$ in the surface acoustic wave transducing unit X, the pairs of switches $W_i$ in the surface acoustic wave transducing unit X, the propagation lanes $U_{Xi}$ as delay elements, the phase shifter $S_R$ in the surface acoustic wave transducing unit X, the amplifier $A_X$, the phase shifter $S_T$ in the surface acoustic wave transducing unit Y, the pairs of switches $W_i$ in the surface acoustic wave transducing unit Y, the propagation lanes $U_{Yi}$ as delay elements, the phase shifter $S_R$ in the surface acoustic wave transducing unit Y, and the amplifier $A_Y$ form N oscillators $H_i$ (i=1, 2, ..., N).

According to other aspect of the present invention there is provided a surface acoustic wave touch-position sensing device comprising at least two surface acoustic wave transducing units X and Y, a nonpiezoelectric plate, a phase shifter $S_T$ including at least a coil $L_1$, and a controlling system connected with the two surface acoustic wave transducing units X and Y. Each surface acoustic wave transducing unit consists of a piezoelectric substrate $P_T$, a piezoelectric substrate $P_R$, an interdigital transducer T, N interdigital transducers $R_i$ (i=1, 2, ..., N), and an earth electrode $G_T$. The interdigital transducer T and the earth electrode GT are formed on an upper- and a lower end surfaces of the piezoelectric substrate $P_T$. The interdigital transducer T consists of two electrodes $T_{-1}$ and $T_{-2}$, and has two kinds of distances between one electrode finger of the electrode $T_{-1}$, and two neighboring electrode fingers of the electrode $T_{-2}$. The interdigital transducers $R_i$ are formed on an upper end surface of the piezoelectric substrate $P_R$. The piezoelectric substrates $P_T$ and $P_R$ are mounted on an upper end surface of the nonpiezoelectric plate through the lower end surfaces of the piezoelectric substrates $P_T$ and $P_R$, respectively.

The interdigital transducer T and the earth electrode $G_T$ receive an electric signal $E_{T1}$ between the electrode $T_{-1}$ and the earth electrode $G_T$, and an electric signal $E_{T2}$ between the electrode $T_{-2}$ and the earth electrode $G_T$ via the phase shifter $S_T$, and excite a surface acoustic wave of the first mode and the higher order modes in the piezoelectric substrate $P_T$. The surface acoustic wave is transmitted to the piezoelectric substrate $P_R$ through the upper end surface of the nonpiezoelectric plate, the phase difference between the electric signals $E_{T1}$ and $E_{T2}$ being $2\pi y$. In this time, $x<\frac{1}{2}$ in a shorter distance xp of the two kinds of distances between one electrode finger of the electrode $T_{i-1}$ and two neighboring electrode fingers of the electrode $T_{i-2}$, and $x+y=\pm\frac{1}{2}$ in the phase difference $2\pi y$ between the electric signals $E_{T1}$ and $E_{T2}$.

Each interdigital transducer $R_i$ transduces the surface acoustic wave to electric signals $E_{Ri}$ (i=1, 2, ..., N).

The controlling system keeps a check on a magnitude of the electric signals $E_{Ri}$, senses a touch with a finger or others on the other end surface of the nonpiezoelectric plate by a decrease or a disappearance in magnitude of the electric signals $E_{Ri}$, and picks out at least one of the interdigital transducers $R_i$ corresponding to the decrease or the disappearance in magnitude of the electric signals $E_{Ri}$.

According to a further aspect of the present invention there is provided an amplifier AMP. Two output terminals of the phase shifter $S_T$ are connected with input terminals of the electrodes $T_{-1}$ and $T_{-2}$, respectively. An input terminal of the phase shifter $S_T$ is connected with an interdigital transducers $R_1$ of the interdigital transducers $R_i$ in the surface acoustic wave transducing unit Y, via the amplifier AMP. The interdigital transducers T in the surface acoustic wave transducing unit Y, a propagation lane $U_{Y1}$, as a delay element, of the surface acoustic wave between the interdigital transducers T and $R_1$ in the surface acoustic wave transducing unit Y, the interdigital transducer $R_1$, the amplifier AMP and the phase shifter $S_T$ form an oscillator $H_1$.

BRIEF DESCRIPTION OF THE DRAWINGS

Other features and advantages of the invention will be clarified from the following description with reference to the attached drawings.

DETAILED DESCRIPTION OF THE PRESENTLY PREFERRED EXEMPLARY EMBODIMENTS

Figure 1:
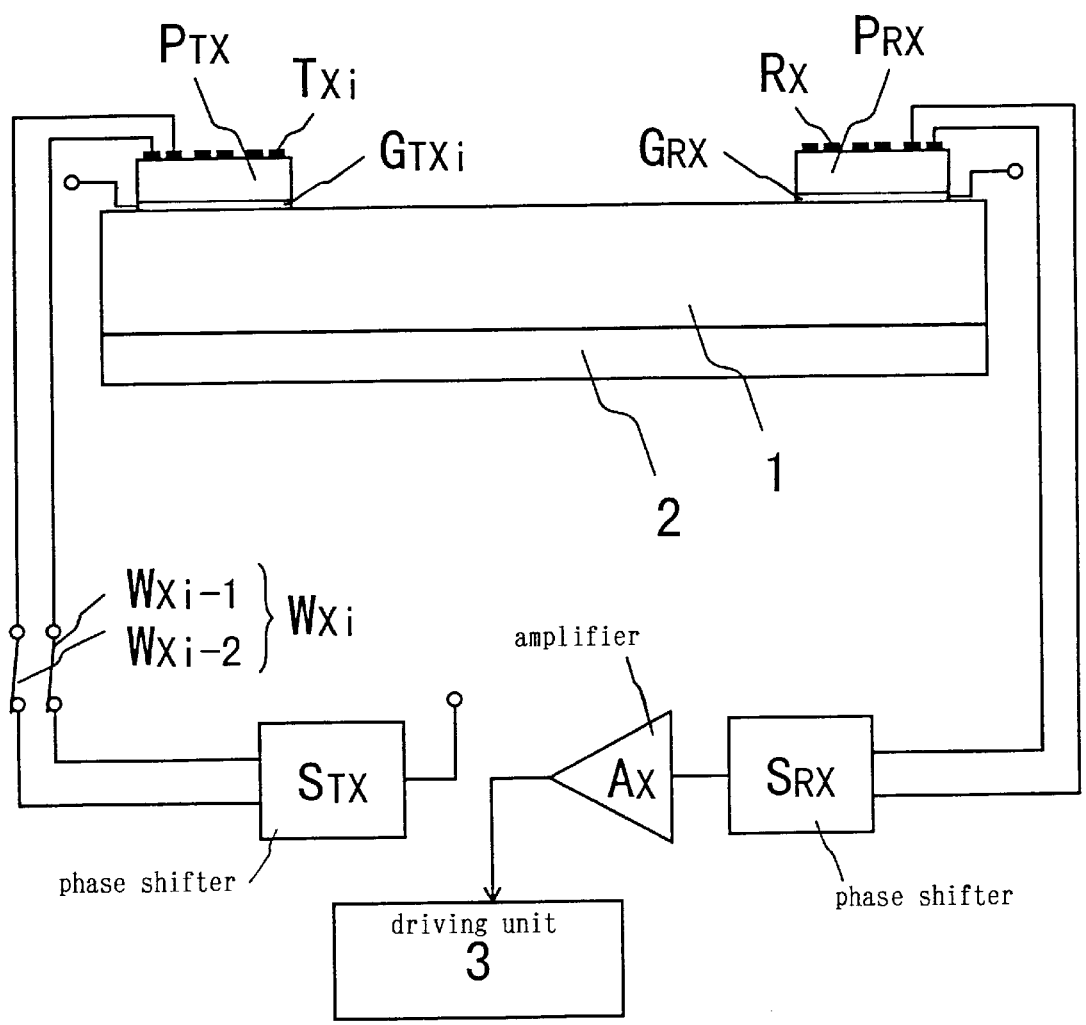
FIG. 1 shows a sectional view of a surface acoustic wave touch-position sensing device according to a first embodiment of the present invention.

FIG. 1 shows a sectional view of a surface acoustic wave touch-position sensing device according to a first embodiment of the present invention. The surface acoustic wave touch-position sensing device comprises nonpiezoelectric plate 1 having an upper- and a lower end surfaces running perpendicular to the thickness direction thereof, supporting board 2, driving unit 3 and two surface acoustic wave transducing units X and Y. Surface acoustic wave transducing unit X comprises piezoelectric substrate $P_{TX}$ having an upper- and a lower end surfaces running perpendicular to the thickness direction thereof, piezoelectric substrate $P_{RX}$ having an upper- and a lower end surfaces running perpendicular to the thickness direction thereof, eight interdigital transducers $T_{Xi}$ (i=1, 2, ..., 8) formed on the upper end surface of piezoelectric substrate $P_{TX}$, interdigital transducer $R_X$ formed on the upper end surface of piezoelectric substrate $P_{RX}$, eight earth electrodes $G_{TXi}$ (i=1, 2, ..., 8) formed on the lower end surface of piezoelectric substrate $P_{TX}$, earth electrode $G_{RX}$ formed on the lower end surface of piezoelectric substrate $P_{RX}$, two phase shifters $S_{TX}$ and $S_{RX}$, amplifier $A_X$, and eight pairs of switches $W_{Xi}$ (i=1, 2, ..., 8). Surface acoustic wave transducing unit Y comprises piezoelectric substrate $P_{TY}$ having an upper- and a lower end surfaces running perpendicular to the thickness direction thereof, piezoelectric substrate $P_{RY}$ having an upper- and a lower end surfaces running perpendicular to the thickness direction thereof, eight interdigital transducers $T_{Yi}$ (i=1, 2, ..., 8) formed on the upper end surface of piezoelectric substrate $P_{TY}$, interdigital transducer $R_Y$ formed on the upper end surface of piezoelectric substrate $P_{RY}$, eight earth electrodes $G_{TYi}$ (i=1, 2, ..., 8) formed on the lower end surface of piezoelectric substrate $P_{TY}$, earth electrode $G_{RY}$ formed on the lower end surface of piezoelectric substrate $P_{RY}$, two phase shifters $S_{TY}$ and $S_{RY}$, amplifier $A_Y$, and eight pairs of switches $W_{Yi}$ (i=1, 2, ..., 8). FIG. 1 shows only nonpiezoelectric plate 1, supporting board 2, driving unit 3 and surface acoustic wave transducing unit X. Each piezoelectric substrate, of which material is TDK-101A (Brand name), has a dimension of 0.15 mm in thickness. Nonpiezoelectric plate 1, made from a glass, has a dimension of 1.5 mm in thickness. Interdigital transducers $T_{Xi}$, $T_{Yi}$, $R_X$, $R_Y$, earth electrodes $G_{TXi}$, $G_{TYi}$, $G_{RX}$ and $G_{RY}$ are made from aluminium thin film, respectively. Piezoelectric substrates $P_{TX}$, $P_{TY}$, $P_{RX}$ and $P_{RY}$ are cemented on the upper end surface of nonpiezoelectric plate 1 through an epoxy resin with thickness of about 20 µm. The lower end surface of nonpiezoelectric plate 1 is cemented on supporting board 2.

Figure 2:
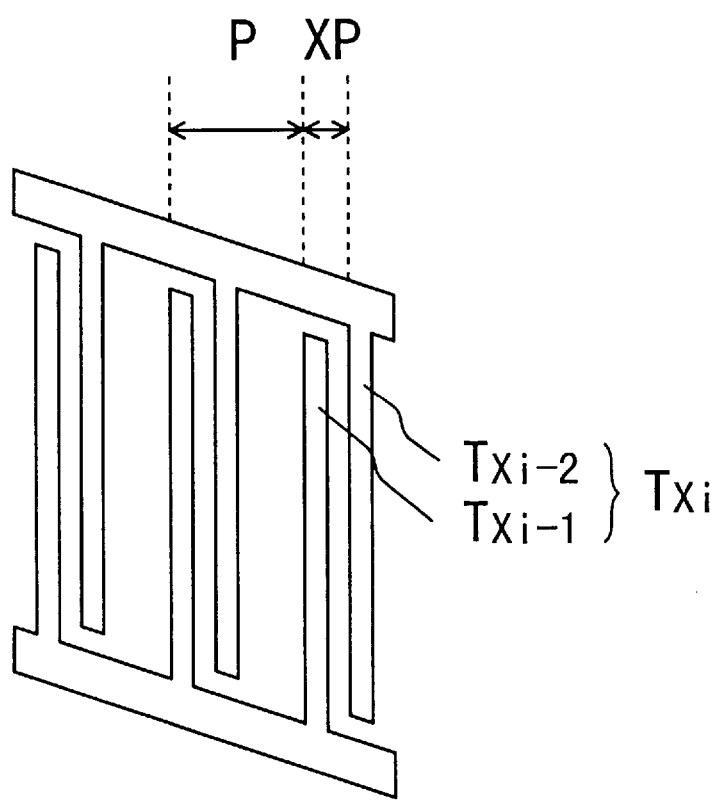
FIG. 2 shows a plan view of interdigital transducer $T_{Xi}$ comprising two electrodes $T_{Xi-1}$ and $T_{Xi-2}$.

FIG. 2 shows a plan view of interdigital transducer $T_{Xi}$ comprising two electrodes $T_{Xi-1}$ and $T_{Xi-2}$. Interdigital transducer $T_{Yi}$, comprising two electrodes $T_{Yi\text{-}1}$ and $T_{Yi\text{-}2}$, has the same parallelogram-type construction as interdigital transducer $T_{Xi}$, consisting of ten finger pairs and having an interdigital periodicity p of 460 µm. Interdigital transducer $R_X$, comprising two electrodes $R_{X\text{-}1}$ and $R_{X\text{-}2}$, and interdigital transducer $R_Y$, comprising two electrodes $R_{Y\text{-}1}$ and $R_{Y\text{-}2}$, have the same parallelogram-type construction as interdigital transducer $T_{Xi}$, with the exception in length of electrode finger. Each interdigital transducer has two kinds of distances between one electrode finger and two neighboring electrode fingers, the shorter distance xp being 115 µm.

Figure 3:
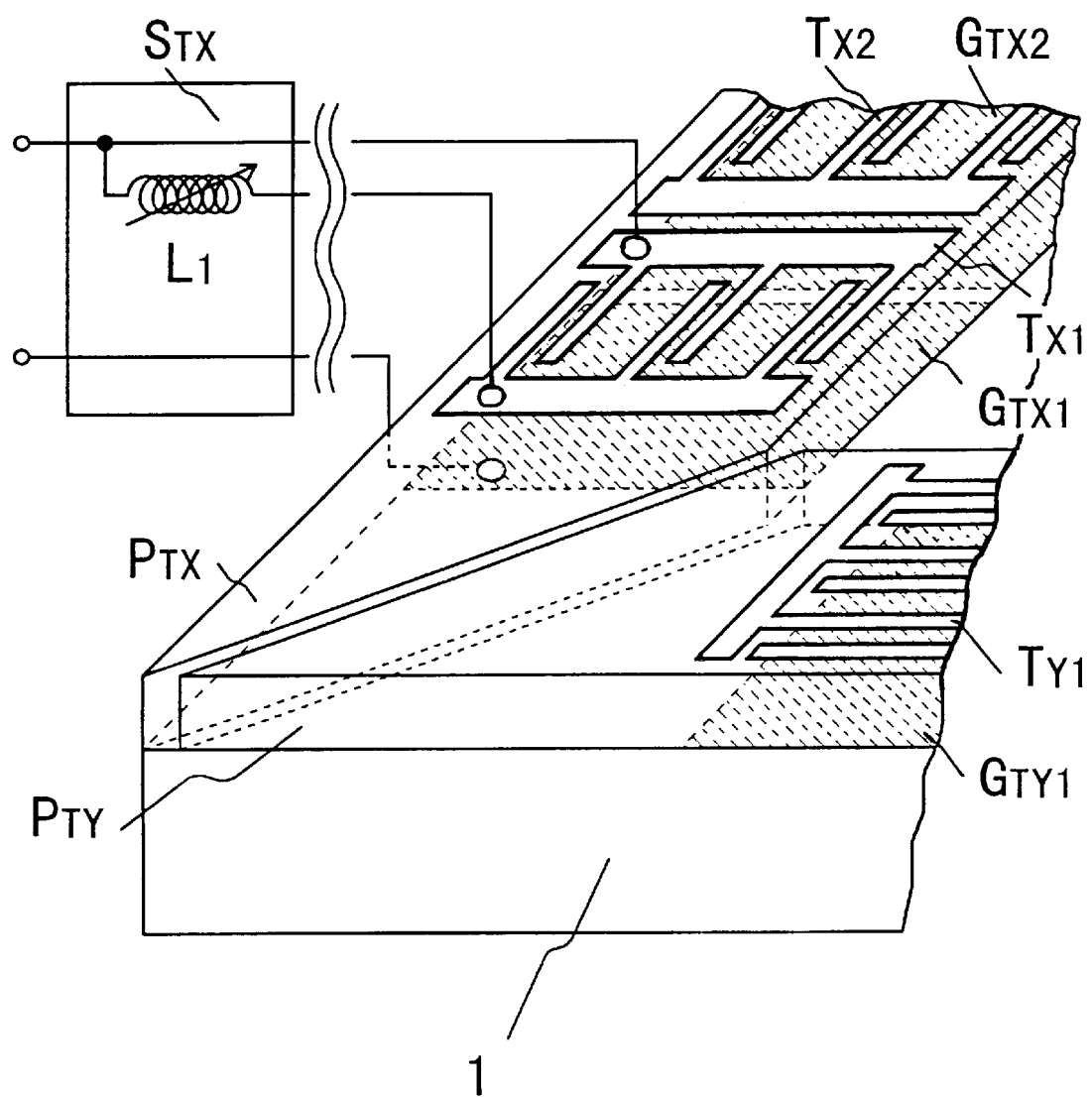
FIG. 3 shows a fragmentary perspective view of the surface acoustic wave touch-position sensing device in FIG. 1.

FIG. 3 shows a fragmentary perspective view of the surface acoustic wave touch-position sensing device in FIG. 1. Supporting board 2, driving unit 3, switches $W_{Xi}$ and $W_{Yi}$ are not drawn in FIG. 3. Interdigital transducer $T_{Xi}$ and earth electrode $G_{TXi}$ are connected with phase shifter $S_{TX}$ including a coil $L_1$, via a pair of switches $W_{Xi}$. For example, interdigital transducer $T_{X1}$ and earth electrode $G_{TX1}$ are connected with phase shifter $S_{TX}$ via a pair of switches $W_{X1}$. Interdigital transducer $T_{Yi}$ and earth electrode $G_{TYi}$ are connected with phase shifter $S_{TY}$ including a coil $L_1$, via a pair of switches $W_{Yi}$. Interdigital transducer $R_X$ and earth electrode $G_{RX}$ are connected with phase shifter $S_{RX}$ including a coil $L_2$. Interdigital transducer $R_Y$ and earth electrode $G_{RY}$ are connected with phase shifter $S_{RY}$ including a coil $L_2$.

Figure 4:
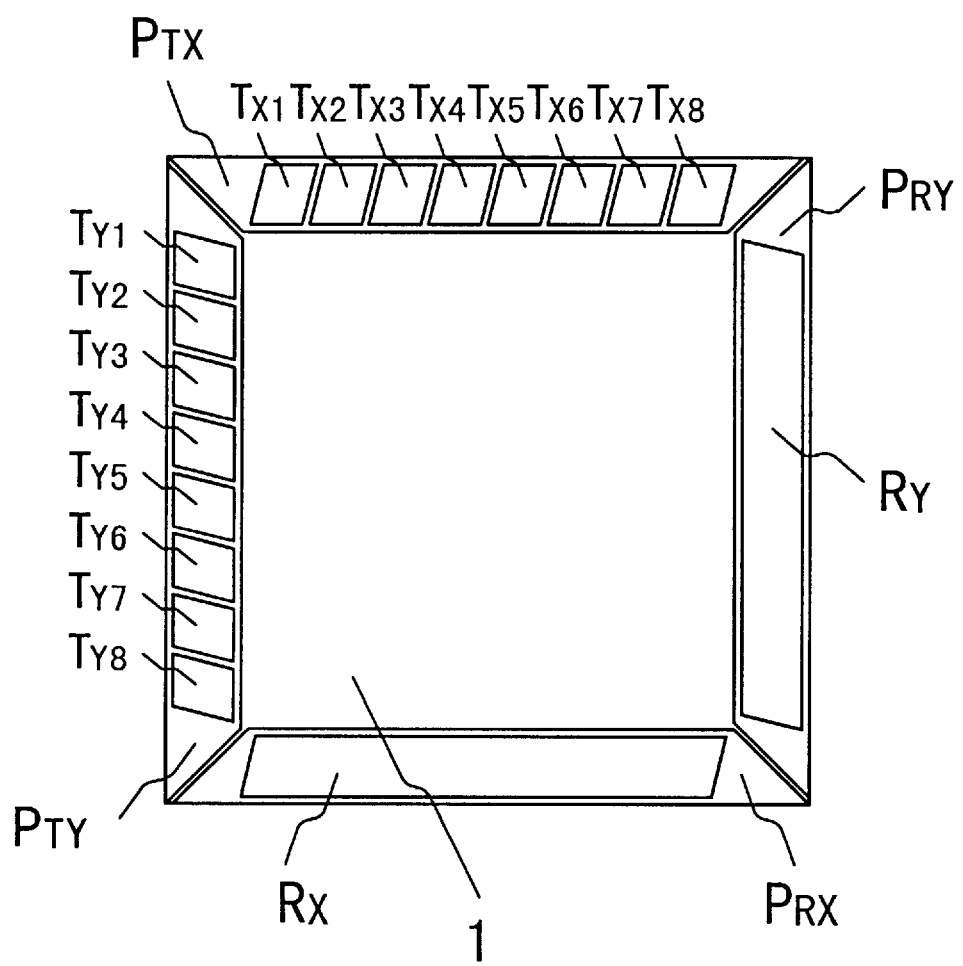
FIG. 4 shows a plan view of the surface acoustic wave touch-position sensing device in FIG. 1.

FIG. 4 shows a plan view of the surface acoustic wave touch-position sensing device in FIG. 1. FIG. 4 shows only nonpiezoelectric plate 1, piezoelectric substrates $P_{TX}$, $P_{TY}$, $P_{RX}$, $P_{RY}$, interdigital transducers $T_{Xi}$, $T_{Yi}$, $R_X$ and $R_Y$. Two neighboring piezoelectric substrates, for example, piezoelectric substrates $P_{TX}$ and $P_{TY}$, can be linked to each other. Thus, it is possible to use only one body formed by piezoelectric substrates $P_{TX}$, $P_{TY}$, $P_{RX}$ and $P_{RY}$.

Figure 5:
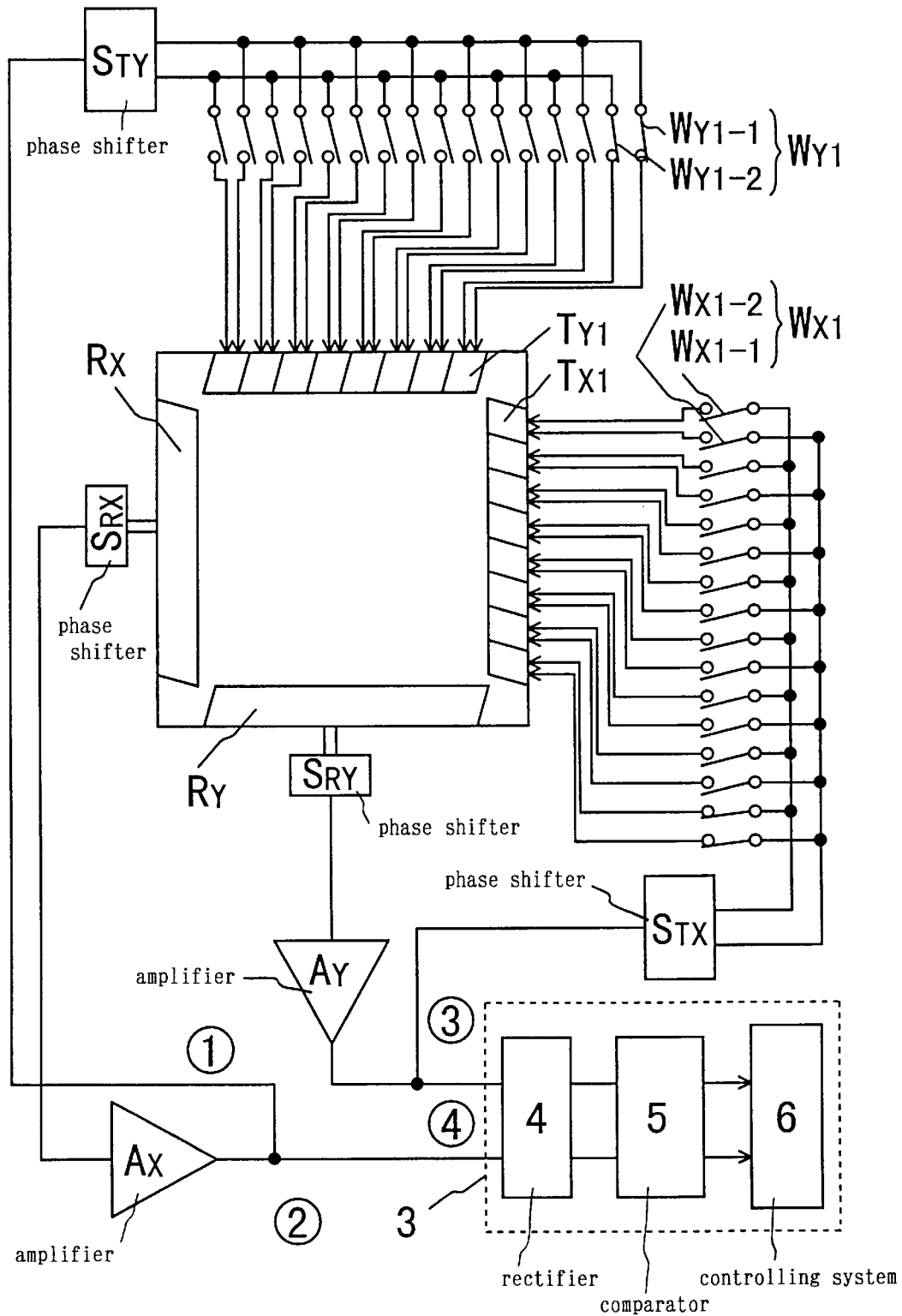
FIG. 5 shows a diagram of a driving circuit of the surface acoustic wave touch-position sensing device in FIG. 1.

FIG. 5 shows a diagram of a driving circuit of the surface acoustic wave touch-position sensing device in FIG. 1. Driving unit 3 comprises rectifier 4, comparator 5 and controlling system 6. A pair of switches $W_{Xi}$ comprises two switches $W_{Xi\text{-}1}$ and $W_{Xi\text{-}2}$, output terminals of switches $W_{Xi\text{-}1}$ and $W_{Xi\text{-}2}$ being connected with input terminals of electrodes $T_{Xi\text{-}1}$ and $T_{Xi\text{-}2}$, respectively. A pair of switches $W_{Yi}$ comprises two switches $W_{Yi\text{-}1}$ and $W_{Yi\text{-}2}$, output terminals of switches $W_{Yi\text{-}1}$ and $W_{Yi\text{-}2}$ being connected with input terminals of electrodes $T_{Yi\text{-}1}$ and $T_{Yi\text{-}2}$, respectively. In FIG. 5, connections of controlling system 6 with eight pairs of switches $W_{Xi}$ and eight pairs of switches $W_{Yi}$ are omitted.

When operating the surface acoustic wave touch-position sensing device in FIG. 1, an electric signal $E_T$ having a frequency approximately corresponding to the interdigital periodicity p of interdigital transducer $T_{Xi}$ is divided into two electric signals $E_{T1}$ and $E_{T2}$, with the phase difference 2 πy, by phase shifter $S_{TX}$, and then, the electric signals $E_{TX1}$ and $E_{T2}$ are applied between electrode $T_{Xi\text{-}1}$ and earth electrode $G_{TXi}$, and between electrode $T_{Xi\text{-}2}$ and earth electrode $G_{TXi}$, respectively, via switches $W_{Xi\text{-}1}$ and $W_{Xi\text{-}2}$. In this time, if x<½ in the shorter distance xp with respect to interdigital transducer $T_{Xi}$ in FIG. 2, and moreover, x+y=±½ in the phase difference 2 πy between the electric signals $E_{T1}$ and $ET_{T2}$, the unidirectional surface acoustic wave, of the first mode and the higher order modes having the wavelength approximately equal to the interdigital periodicity p of interdigital transducer $T_{Xi}$, is excited in piezoelectric substrate $P_{TX}$. For example, if x=¼, y=¼ or y=–¾. Thus, when xp=115 µm with respect to interdigital transducer $T_{Xi}$ as shown in FIG. 2, and moreover, 2 πy=π/2(90°) or 2 πy=–3 π/2(–270°), the unidirectional surface acoustic wave is excited in piezoelectric substrate $P_{TX}$. The excitation of the unidirectional surface acoustic wave generates no reflection of a surface acoustic wave at the side surface of piezoelectric substrate $P_{TX}$, so that seldom or never makes a noise. In addition, the excitation of the unidirectional surface acoustic wave reduces a waste of an electric energy applied to interdigital transducer $T_{Xi}$, causing the surface acoustic touch-position sensing device in FIG. 1 to be operated under low power consumption with low voltage.

The unidirectional surface acoustic wave excited in piezoelectric substrate $P_{TX}$ is transmitted to the upper end surface of nonpiezoelectric plate 1. If the phase velocity of the unidirectional surface acoustic wave of the first mode and the higher order modes is approximately equal to the phase velocity of the Rayleigh wave traveling on nonpiezoelectric plate 1, the transducing efficiency from the electric signal $E_T$ to the unidirectional surface acoustic wave increases, and in addition, the reflection caused by the miss-matching on the acoustic impedance at the boundary surface between piezoelectric substrate $P_{TX}$ and nonpiezoelectric plate 1 hardly ever causes.

If the thickness d of piezoelectric substrate $P_{TX}$ is smaller than the interdigital periodicity p of interdigital transducer $T_{Xi}$, and the thickness of nonpiezoelectric plate 1 is larger than three times the interdigital periodicity p, the unidirectional surface acoustic wave excited in piezoelectric substrate $P_{TX}$ is transmitted to the upper end surface of nonpiezoelectric plate 1 effectively without a leakage of the unidirectional surface acoustic wave on the inside of nonpiezoelectric plate 1.

If using a material, as nonpiezoelectric plate 1, such that the phase velocity of the unidirectional surface acoustic wave traveling on nonpiezoelectric plate 1 alone is higher than that traveling on piezoelectric substrate $P_{TX}$ alone, the unidirectional surface acoustic wave excited in piezoelectric substrate $P_{TX}$ is transmitted to the upper end surface of nonpiezoelectric plate 1 effectively without a leakage of the unidirectional surface acoustic wave on the inside of nonpiezoelectric plate 1. Accordingly, it is possible to operate the surface acoustic wave touch-position sensing device in FIG. 1 under low power consumption with low voltage, and to support the lower end surface of nonpiezoelectric plate 1 directly.

If using a piezoelectric ceramic having the polarization axis parallel to the thickness direction thereof, as piezoelectric substrate $P_{TX}$, the unidirectional surface acoustic wave of the first mode and the higher order modes is excited in piezoelectric substrate $P_{TX}$ effectively, and the transducing efficiency from the electric signal $E_T$ to the unidirectional surface acoustic wave increases.

If using a piezoelectric polymer such as PVDF and so on, as piezoelectric substrate $P_{TX}$, the unidirectional surface acoustic wave of the first mode and the higher order modes is excited in piezoelectric substrate $P_{TX}$ effectively, and the transducing efficiency from the electric signal $E_T$ to the unidirectional surface acoustic wave increases.

The unidirectional surface acoustic wave on the upper end surface of nonpiezoelectric plate 1 is transmitted to piezoelectric substrate $P_{RX}$. Interdigital transducer $R_X$ is located so that the surface acoustic wave transmitting direction from interdigital transducer $T_{Xi}$ and the surface acoustic wave receiving direction at interdigital transducer $R_X$ overlap each other, as shown in FIG. 4. Therefore, if x<½ in the shorter distance xp with respect to interdigital transduce $R_X$ in FIG. 2, the unidirectional surface acoustic wave, of the first mode and the higher order modes, having the wavelength approximately equal to the interdigital periodicity p of interdigital transducer $R_X$, is transduced to an electric signal $E_{R1}$ between electrode $R_{X-1}$ and earth electrode $G_{RX}$, and an electric signal $E_{R2}$ between electrode $R_{X-2}$ and earth electrode $G_{RX}$. In this time, x+y=±½ in the phase difference 2 πy between the electric signals $E_{R1}$ and $E_{R2}$. For example, if x=¼, y=¼ or y=–¾. Thus, when xp=115 μm with respect to interdigital transduce $R_X$ as shown in FIG. 2, the electric signals $E_{R1}$ and $E_{R2}$, where 2 πy=π/2(90°) or 2πy=–3 π/2(–270°), are delivered between electrode $R_{X-1}$ and earth electrode $G_{RX}$, and between electrode $R_{X-2}$ and earth electrode $G_{RX}$, respectively. Each of the electric signals $E_{R1}$ and $E_{R2}$ has a frequency approximately corresponding to the interdigital periodicity p of interdigital transducer $R_X$.

If the phase velocity of the unidirectional surface acoustic wave of the first mode and the higher order modes is approximately equal to the phase velocity of the Rayleigh wave traveling on nonpiezoelectric plate 1, the transducing efficiency from the unidirectional surface acoustic wave to the electric signals $E_{R1}$ and $E_{R2}$ increases, and the electric signals $E_{R1}$ and $E_{R2}$ are delivered at interdigital transducer $R_X$ with a quick response time. In addition, the reflection caused by the miss-matching on the acoustic impedance at the boundary surface between piezoelectric substrate $P_{RX}$ and nonpiezoelectric plate 1 hardly ever causes.

If the thickness d of piezoelectric substrate $P_{RX}$ is smaller than the interdigital periodicity p of interdigital transducer $R_X$, and the thickness of nonpiezoelectric plate 1 is larger than three times the interdigital periodicity p, the unidirectional surface acoustic wave on the upper end surface of nonpiezoelectric plate 1 is transmitted to piezoelectric substrate $P_{RX}$ effectively without a leakage of the unidirectional surface acoustic wave on the inside of nonpiezoelectric plate 1. Accordingly, it is possible to operate the surface acoustic wave touch-position sensing device FIG. 1 under low power consumption with low voltage, and to support the lower end surface of nonpiezoelectric plate 1 directly.

If using a material, as nonpiezoelectric plate 1, such that the phase velocity of the unidirectional surface acoustic wave traveling on nonpiezoelectric plate 1 alone is higher than that traveling on piezoelectric substrate $P_{RX}$ alone, the unidirectional surface acoustic wave on the upper end surface of nonpiezoelectric plate 1 is transmitted to piezoelectric substrate $P_{RX}$ effectively without a leakage of the unidirectional surface acoustic wave on the inside of nonpiezoelectric plate 1.

If using a piezoelectric ceramic having the polarization axis parallel to the thickness direction thereof, as piezoelectric substrate $P_{RX}$, the unidirectional surface acoustic wave on the upper end surface of nonpiezoelectric plate 1 is transmitted to piezoelectric substrate $P_{RX}$ effectively, and the transducing efficiency from the unidirectional surface acoustic wave to the electric signals $E_{R1}$ and $E_{R2}$ increases.

If using a piezoelectric polymer such as PVDF and so on, as piezoelectric substrate $P_{RX}$, the unidirectional surface acoustic wave on the upper end surface of nonpiezoelectric plate 1 is transmitted to piezoelectric substrate $P_{RX}$ effectively, and the transducing efficiency from the unidirectional surface acoustic wave to the electric signals $E_{R1}$ and $E_{R2}$ increases.

The electric signals $E_{R1}$ and $E_{R2}$ are combined and detected as an electric signal $E_R$ at phase shifter $S_{RX}$. The electric signal $E_R$ is amplified via amplifier $A_X$. An electric signal ①, which is a part of the amplified electric signal via amplifier $A_X$ and is corresponding to the electric signal $E_T$, is divided into two electric signals $E_{T1}$ and $E_{T2}$ by phase shifter $S_{TY}$. The electric signals $E_{T1}$ and $E_{T2}$ are applied between electrode $T_{Yi-1}$ and earth electrode $G_{TYi}$, and between electrode $T_{Yi-2}$ and earth electrode $G_{TYi}$, respectively, via switches $W_{Yi-1}$ and $W_{Yi-2}$. An electric signal ②, which is the remaining part of the amplified electric signal via amplifier $A_X$, is transmitted to controlling system 6 via rectifier 4 and comparator 5. Surface acoustic wave transducing unit Y is equivalent to the surface acoustic wave transducing unit X. Thus, when the electric signals $E_{T1}$ and $E_{T2}$ are applied between electrode $T_{Yi-1}$ and earth electrode $G_{TYi}$, and between electrode $T_{Yi-2}$ and earth electrode $G_{TYi}$, respectively, the unidirectional surface acoustic wave, of the first mode and the higher order modes having the wavelength approximately equal to the interdigital periodicity p of interdigital transducer $T_{Yi}$, is excited in piezoelectric substrate $P_{TY}$. The unidirectional surface acoustic wave is transmitted to the upper end surface of nonpiezoelectric plate 1. The unidirectional surface acoustic wave on the upper end surface of nonpiezoelectric plate is transmitted to piezoelectric substrate $P_{RY}$. The unidirectional surface acoustic wave, in piezoelectric substrate $P_{RY}$, having the wavelength approximately equal to the interdigital periodicity p of interdigital transducer $R_Y$, is transduced to an electric signal $E_{R1}$ between electrode $R_{Y-1}$ and earth electrode $G_{RY}$, and an electric signal $E_{R2}$ between electrode $R_{Y-2}$ and earth electrode $G_{RY}$. The electric signals $E_{R1}$ and $E_{R2}$ are combined and detected as an electric signal $E_R$ at phase shifter $S_{RY}$. The electric signal $E_R$ is amplified via amplifier $A_Y$. An electric signal ③, which is a part of the amplified electric signal via amplifier $A_Y$, is transmitted to phase shifter $S_{TX}$, and an electric signal ④, which is the remaining part of the amplified electric signal via amplifier $A_Y$, is transmitted to controlling system 6 via rectifier 4 and comparator 5.

Controlling system 6 plays four roles. The first role is to turn on and off eight pairs of switches $W_{Xi}$ with a fixed period in turn, and eight pairs of switches $W_{Yi}$ with a fixed period in turn, eight pairs of switches $W_{Xi}$ being closed in turn while a pair of switches $W_{Yi}$ is closed. In this time, switches $W_{Xi-1}$ and $W_{Xi-2}$ are in the same condition each other, and switches $W_{Yi-1}$ and $W_{Yi-2}$ are in the same condition each other. The second role is to keep a check on a magnitude of the electric signal $E_R$. The third role is to sense a touch with a finger or others on a part, surrounded by piezoelectric substrates $P_{TX}$, $P_{TY}$, $P_{RX}$ and $P_{RY}$, of the upper end surface of nonpiezoelectric plate 1 by a decrease or a disappearance in magnitude of the electric signal $E_R$. The part of the upper end surface of nonpiezoelectric plate 1 is called a touch face from now on. The fourth role is to pick out the pair of switches $W_{Xi}$ closed when a decrease or a disappearance in magnitude of the electric signal $E_R$ at phase shifter $S_{RX}$ happens, and the pair of switches $W_{Yi}$ closed when a decrease or a disappearance in magnitude of the electric signal $E_R$ at phase shifter $S_{RY}$ happens, and then specifying a touch-position, corresponding with the picked out pairs of switches $W_{Xi}$ and $W_{Yi}$, on the touch face.

Surface acoustic wave transducing unit X has eight propagation lanes $U_{Xi}$ (i=1, 2, ..., 8) of the surface acoustic wave on the touch face between interdigital transducer $T_{Xi}$ and $R_X$. Surface acoustic wave transducing unit Y has eight propagation lanes $U_{Yi}$ (i=1, 2, ..., 8) of the surface acoustic wave on the touch face between interdigital transducer $T_{Yi}$ and $R_Y$. If touching a crossing point of propagation lanes $U_{Xi}$ and $U_{Yi}$ on the touch face with a pen, the surface acoustic wave is intercepted at the crossing point. Therefore, the magnitude of the electric signal $E_R$ at phase shifter $S_{RX}$ and the magnitude of the electric signal $E_R$ at phase shifter $S_{RY}$ are decreased or disappeared. Thus, it is possible to sense a touch with the pen on the touch face, moreover, to specify a touch-position corresponding to the crossing point with a high sensitivity and a quick response time. If touching, for example, a crossing point of propagation lanes $U_{X3}$ and $U_{Y5}$, a decrease or a disappearance in magnitude of the electric signal $E_R$ at phase shifter $S_{RX}$ happens only when the pair of switches $W_{X3}$ is closed, and a decrease or a disappearance in magnitude of the electric signal $E_R$ at phase shifter $S_{RY}$ happens only when the pair of switches $W_{Y5}$ is closed. Thus, it is possible to specify a touch-position on the touch face by picking out a pair of switches $W_{Xi}$ closed when a decrease or a disappearance in magnitude of the electric signal $E_R$ at phase shifter $S_{RX}$ happens, and a pair of switches $W_{Yi}$ closed when a decrease or a disappearance in magnitude of the electric signal $E_R$ at phase shifter $S_{RY}$ happens.

Each interdigital transducer has the parallelogram-type construction as shown in FIG. 2. Besides, interdigital transducers $T_{Xi}$ are arranged as they stand in a line, and interdigital transducers $T_{Yi}$ are similar to interdigital transducers $T_{Xi}$ as shown in FIG. 4. Therefore, two neighbors of propagation lanes $U_{Xi}$ are closed, and two neighbors of propagation lanes $U_{Yi}$ are also closed, so that there is no gap between two neighbors of propagation lanes $U_{Xi}$, and between two neighbors of propagation lanes $U_{Yi}$. Thus, all the touch face is of practical use, in other words, a response to a touch on the touch face is obtained without fail. As a result, it is possible to specify a touch-position on the touch face with precision. In addition, in case that two neighbors of propagation lanes $U_{Xi}$ are partially overlapping each other, the two neighbors of propagation lanes $U_{Xi}$ are specified if touching an overlapping area of the two neighbors of propagation lanes $U_{Xi}$ on the touch face. Accordingly, it becomes clear that the touch-position on the touch face is located between the two neighbors of propagation lanes $U_{Xi}$. Regarding two neighbors of propagation lanes $U_{Yi}$ partially overlapping each other, the touch-position is specified in the same way.

Input terminal of phase shifter $S_{TY}$ is connected with output terminal of phase shifter $S_{RX}$ via amplifier $A_X$, on the other hand, input terminal of phase shifter $S_{TX}$ is connected with output terminal of phase shifter $S_{RY}$ via amplifier $A_Y$. As a result, phase shifter $S_{TX}$, pairs of switches $W_{Xi}$, propagation lanes $U_{Xi}$ as delay elements, phase shifter $S_{RX}$, amplifier $A_X$, phase shifter $S_{TY}$, pairs of switches $W_{Yi}$, propagation lanes $U_{Yi}$ as delay elements, phase shifter $S_{RY}$, and amplifier $A_Y$ form eight oscillators $H_i$ (i=1, 2, ..., 8). Oscillator $H_i$ enables the surface acoustic wave touch-position sensing device in FIG. 1 to have a small-sized circuit with a simple structure. The small-sized circuit causes the surface acoustic wave touch-position sensing device to have a small size which is very light in weight, and to be operated under low power consumption with low voltage.

Figure 6:
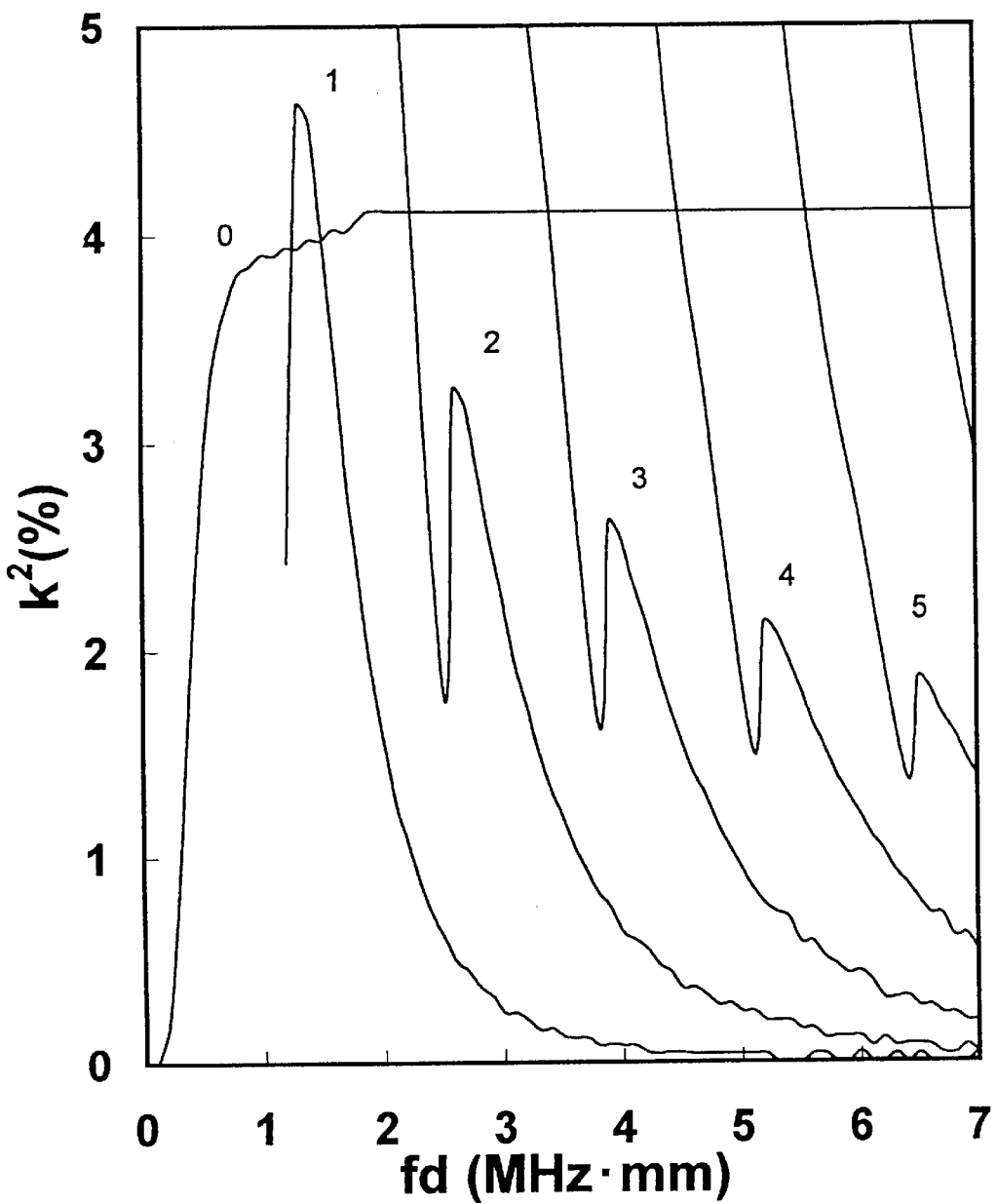
FIG. 6 shows a relationship between the electromechanical coupling constant $k^2$, and the product fd of the frequency f of the surface acoustic wave and the thickness d of piezoelectric substrate $P_{TX}$.

FIG. 6 shows a relationship between the electromechanical coupling constant $k^2$ calculated from the difference between the phase velocity under electrically opened condition and that under electrically shorted condition of piezoelectric substrate $P_{TX}$, and the product fd of the frequency f of the surface acoustic wave and the thickness d of piezoelectric substrate $P_{TX}$. In FIG. 6, nonpiezoelectric plate 1 is made from a glass having a shear wave velocity of 3091 m/s and a longitudinal wave velocity of 5592 m/s traveling on the glass alone. The velocities of 3091 m/s and 5592 m/s are about 1.3 times the velocities of a shear- and a longitudinal waves, 2450 m/s and 4390 m/s, respectively, in piezoelectric substrate $P_{TX}$ alone. An electric energy applied to interdigital transducer $T_{Xi}$ or $T_{Yi}$ is most easily transduced to the first mode surface acoustic wave when the fd value is approximately 1.3 MHz-mm, then the $k^2$ value is approximately 4.7% being the maximum value. It is clear that the $k^2$ value of 4.7% is worthy in comparison that a crystallized $LiNbO_3$ used as a popular piezoelectric body for exciting a surface acoustic wave generally has the $k^2$ value of approximately 5%.

Figure 7:
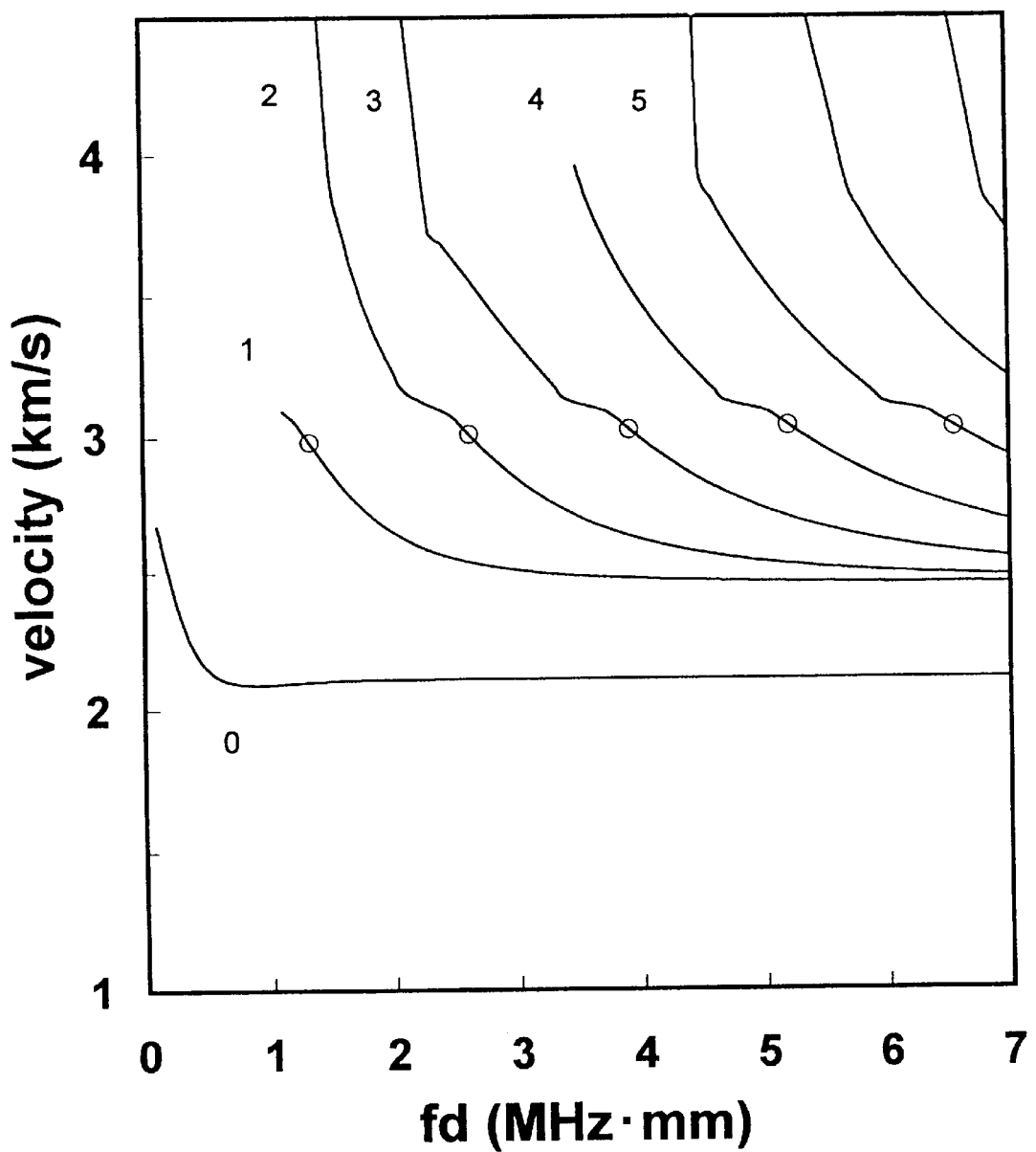
FIG. 7 shows a relationship between the phase velocity of the surface acoustic wave for each mode in piezoelectric substrate $P_{TX}$, and the fd value.

FIG. 7 shows a relationship between the phase velocity of the surface acoustic wave for each mode in piezoelectric substrate $P_{TX}$, and the fd value. In FIG. 7, nonpiezoelectric plate 1 is made from the same glass as FIG. 6. The fd value at each mark ○ has the maximum $k^2$ value where an electric energy applied to interdigital transducer $T_{Xi}$ or $T_{Yi}$ is most easily transduced to the surface acoustic wave, the maximum $k^2$ value being obtained from FIG. 6. The phase velocity of the surface acoustic wave of the first mode and the higher order modes at the mark ○ is approximately 2980 m/s, which is approximately equal to the phase velocity of the Rayleigh wave traveling on nonpiezoelectric plate 1 alone, the phase velocity of the Rayleigh wave being 2850 m/s.

Figure 8:
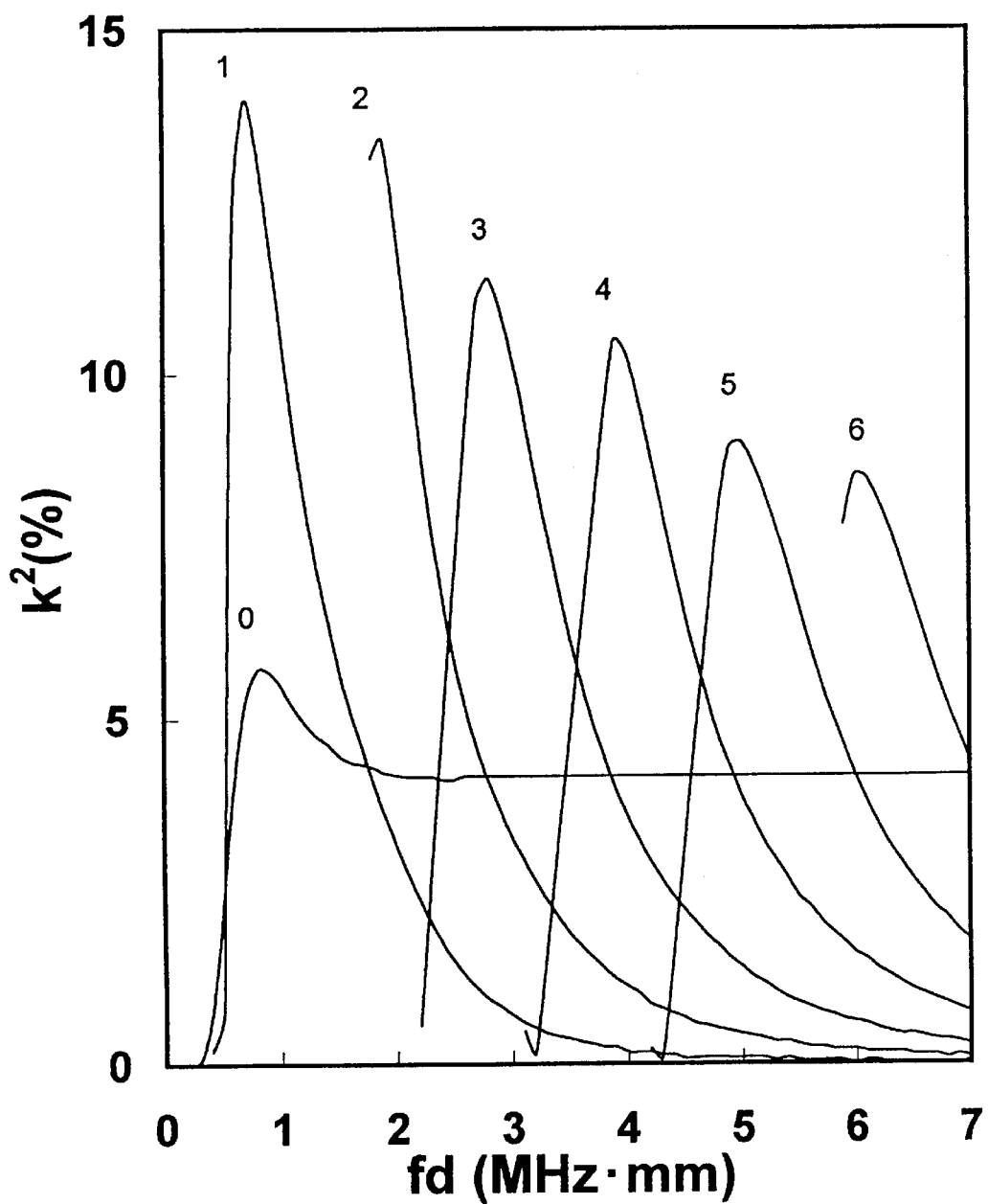
FIG. 8 shows a relationship between the $k^2$ value and the fd value.

FIG. 8 shows a relationship between the $k^2$ value and the fd value. In FIG. 8, nonpiezoelectric plate 1 is made from a glass having a shear wave velocity of 4203 m/s and a longitudinal wave velocity of 7604 m/s traveling on the glass alone. The velocities of 4203 m/s and 7604 m/s are about 1.7 times the velocities of a shear- and a longitudinal waves, 2450 m/s and 4390 m/s, respectively, in piezoelectric substrate $P_{TX}$ alone. An electric energy applied to interdigital transducer $T_{Xi}$ or $T_{Yi}$ is most easily transduced to the first mode surface acoustic wave when the fd value is approximately 0.7 MHz-mm, then the $k^2$ value is approximately 14.0 % being the maximum value.

Figure 9:
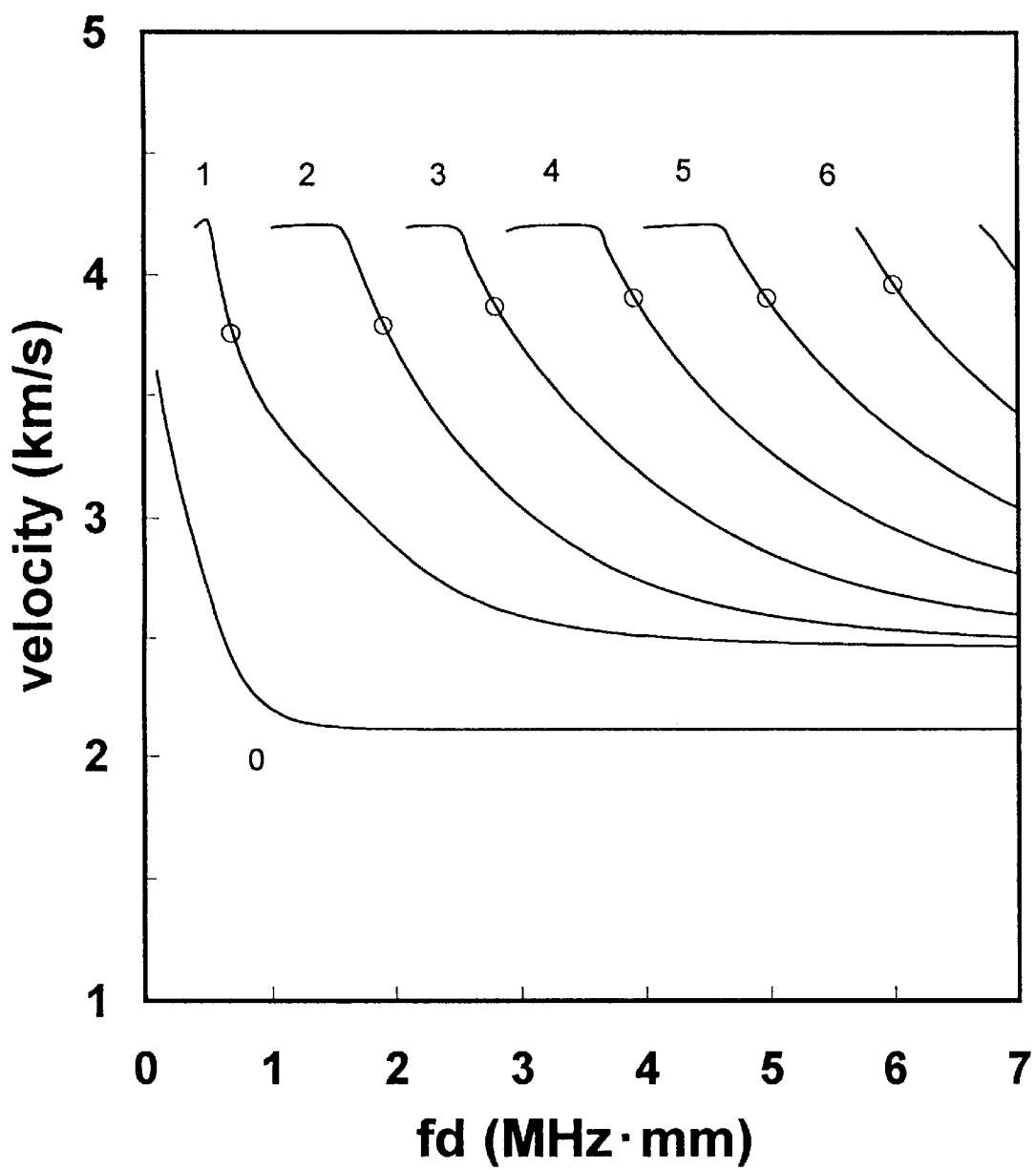
FIG. 9 shows a relationship between the phase velocity of the surface acoustic wave with each mode in piezoelectric substrate $P_{TX}$, and the fd value.

FIG. 9 shows a relationship between the phase velocity of the surface acoustic wave with each mode in piezoelectric substrate $P_{TX}$, and the fd value. In FIG. 9, nonpiezoelectric plate 1 is made from the same glass as FIG. 8. The fd value at each mark ○ has the maximum $k^2$ value where an electric energy applied to interdigital transducer $T_{Xi}$ or $T_{Yi}$ is most easily transduced to the surface acoustic wave, the maximum $k^2$ value being obtained from FIG. 8. The phase velocity of the surface acoustic wave of the first mode and the higher order modes at the mark ○ is approximately 3800 m/s, which is approximately equal to the phase velocity of the Rayleigh wave traveling on nonpiezoelectric plate 1 alone, the phase velocity of the Rayleigh wave being 3860 m/s.

It is clear from FIGS. 6~9 that an electric energy applied to interdigital transducer $T_{Xi}$ or $T_{Yi}$ is most easily transduced to the surface acoustic wave of the first mode and the higher order modes having the phase velocity approximately equal to the phase velocity of the Rayleigh wave traveling on nonpiezoelectric plate 1 alone. In the same way, the surface acoustic wave, of the first mode and the higher order modes, having the phase velocity approximately equal to the phase velocity of the Rayleigh wave traveling on nonpiezoelectric plate 1 alone, is most easily transduced to an electric signal at interdigital transducer $R_X$ or $R_Y$.

Figure 10:
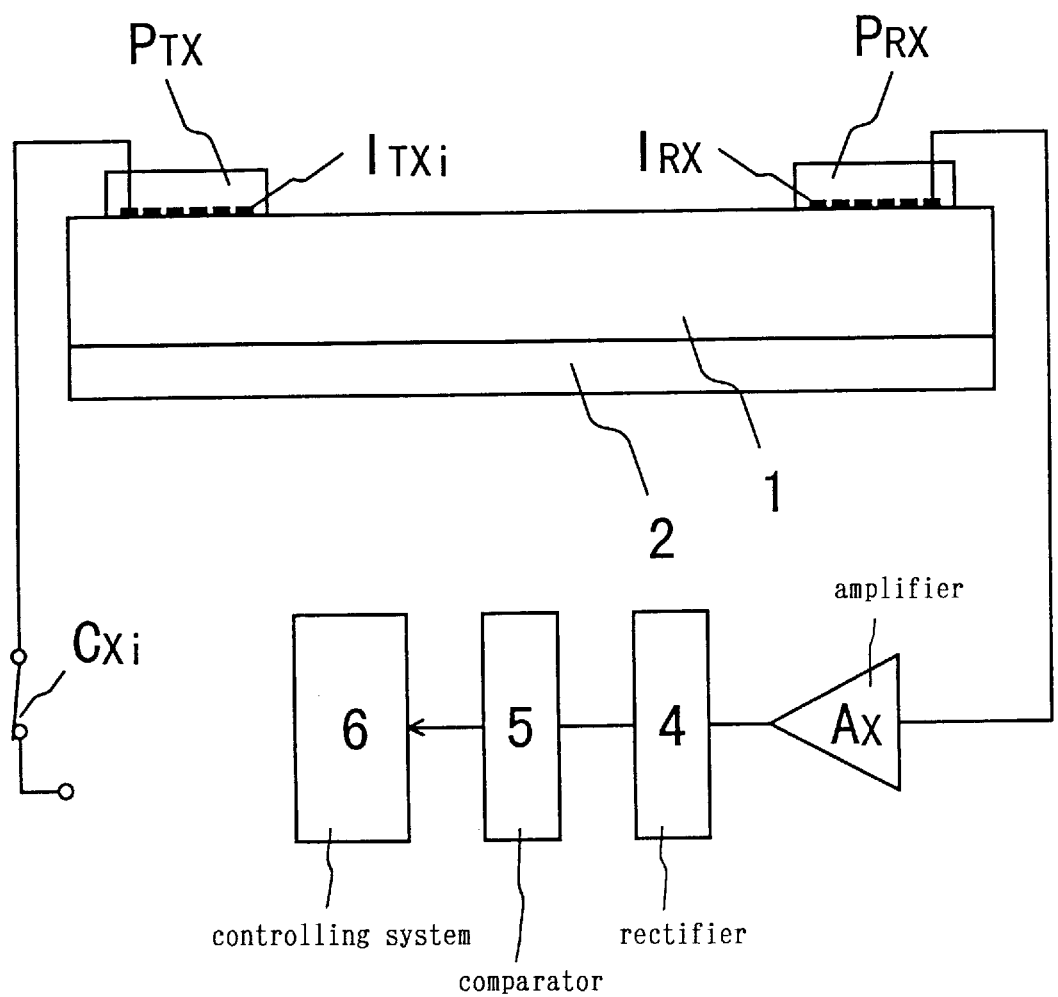
FIG. 10 shows a sectional view of a surface acoustic wave touch-position sensing device according to a second embodiment of the present invention.

FIG. 10 shows a sectional view of a surface acoustic wave touch-position sensing device according to a second embodiment of the present invention. Excepting surface acoustic wave transducing units X and Y, the surface acoustic wave touch-position sensing device in FIG. 10 has the same construction as that in FIG. 1. Surface acoustic wave transducing unit X in FIG. 10 comprises piezoelectric substrate $P_{TX}$, piezoelectric substrate $P_{RX}$, eight interdigital transducers $I_{TXi}$ (i=1, 2, ..., 8) formed on the lower end surface of piezoelectric substrate $P_{TX}$, interdigital transducer $I_{RX}$ formed on the lower end surface of piezoelectric substrate $P_{RX}$, amplifier $A_X$, and eight switches $C_{Xi}$ (i=1, 2, ..., 8). Surface acoustic wave transducing unit Y in FIG. 10 comprises piezoelectric substrate $P_{TY}$, piezoelectric substrate $P_{RY}$, eight interdigital transducers $I_{TYi}$ (i=1, 2, ..., 8) formed on the lower end surface of piezoelectric substrate $P_{TY}$, interdigital transducer $I_{RY}$ formed on the lower end surface of piezoelectric substrate $P_{RY}$, amplifier $A_Y$, and eight switches $C_{Yi}$ (i=1, 2 ..., 8). FIG. 10 shows only nonpiezoelectric plate 1, supporting board 2, driving unit 3 comprising rectifier 4, comparator 5 and controlling system 6, and surface acoustic wave transducing unit X. Interdigital transducers $I_{TXi}$, $I_{TYi}$, $I_{RX}$ and $I_{RY}$ are made from aluminium thin film. Piezoelectric substrates $P_{TX}$, $P_{TY}$, $P_{RX}$ and $P_{RY}$ are cemented on the upper end surface of nonpiezoelectric plate 1 through an epoxy resin with thickness of about 20 $\mu$m. The lower end surface of nonpiezoelectric plate 1 is cemented on supporting board 2.

Figure 11:
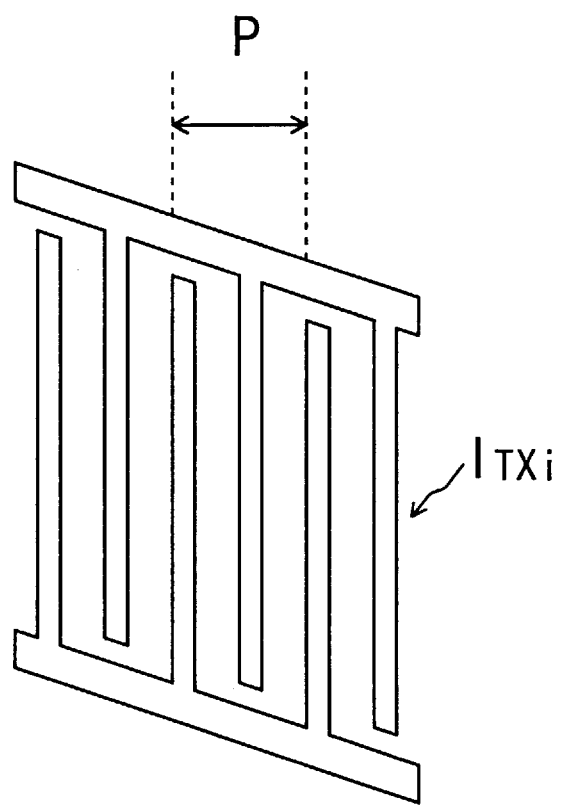
FIG. 11 shows a plan view of interdigital transducer $I_{TXi}$.

FIG. 11 shows a plan view of interdigital transducer $I_{TXi}$. Interdigital transducers $I_{TXi}$ and $I_{TYi}$ have the same construction each other. Interdigital transducers $I_{RX}$ and $I_{RY}$ have the same construction as interdigital transducer $I_{TXi}$ with the exception in length of electrode finger. Interdigital transducer $I_{TXi}$ has a parallelogram-type construction consisting of ten finger pairs and having an interdigital periodicity p of 460 $\mu$m. Interdigital transducer $I_{TXi}$ has the same construction as interdigital transducer $T_{Xi}$ in FIG. 2, except that interdigital transducer $T_{Xi}$ has two kinds of distances between one electrode finger and two neighboring electrode fingers. Interdigital transducer $I_{TXi}$ has an equal distance between two electrode fingers.

Figure 12:
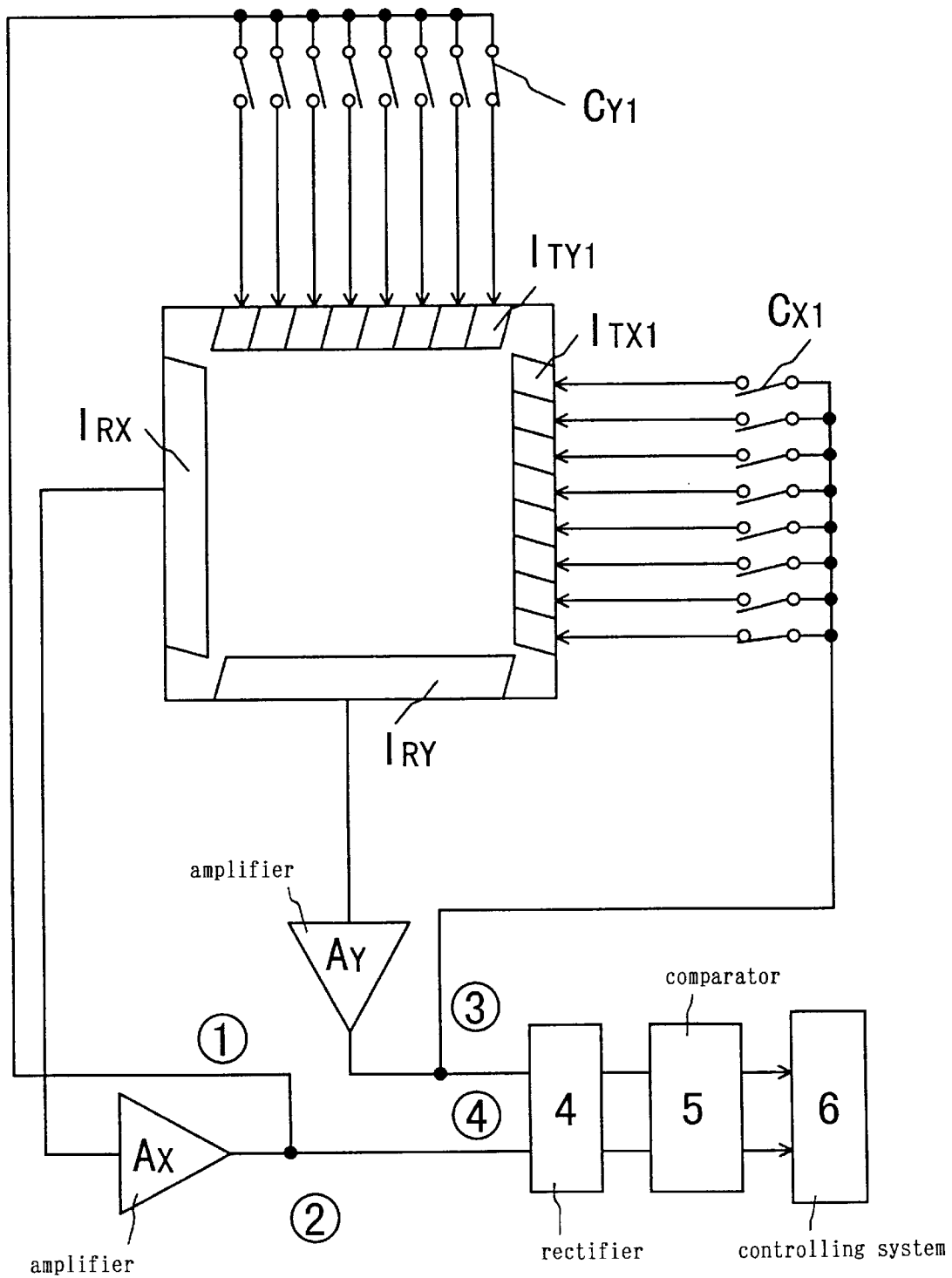
FIG. 12 shows a diagram of a driving circuit of the surface acoustic wave touch-position sensing device in FIG. 10.

FIG. 12 shows a diagram of a driving circuit of the surface acoustic wave touch-position sensing device in FIG. 10. Output terminals of switches $C_{Xi}$ and $C_{Yi}$ are connected with input terminals of interdigital transducers $I_{TXi}$, and $I_{TYi}$, respectively. In FIG. 10, connections of controlling system 6 with switches $C_{Xi}$ and $C_{Yi}$ are not drawn.

When operating the surface acoustic wave touch-position sensing device in FIG. 10, an electric signal $E_T$ having a frequency approximately corresponding to the interdigital periodicity p of interdigital transducer $I_{TXi}$ is applied to interdigital transducer $I_{TXi}$ via switches $C_{Xi}$, the surface acoustic wave, of the first mode and the higher order modes having the wavelength approximately equal to the interdigital periodicity p of interdigital transducer $I_{TXi}$, is excited in piezoelectric substrate $P_{TX}$. The surface acoustic wave excited in piezoelectric substrate $P_{TX}$ is transmitted to the upper end surface of nonpiezoelectric plate 1. If the phase velocity of the acoustic wave of the first mode and the higher order modes is approximately equal to the phase velocity of the Rayleigh wave traveling on nonpiezoelectric plate 1, the transducing efficiency from the electric signal $E_T$ to the surface acoustic wave increases, and in addition, the reflection caused by the miss-matching on the acoustic impedance at the boundary surface between piezoelectric substrate $P_{TX}$ and nonpiezoelectric plate 1 hardly ever causes.

If the thickness d of piezoelectric substrate $P_{TX}$ is smaller than the interdigital periodicity p of interdigital transducer $I_{TXi}$, and the thickness of nonpiezoelectric plate 1 is larger than three times the interdigital periodicity p, the surface acoustic wave excited in piezoelectric substrate $P_{TX}$ is transmitted to the upper end surface of nonpiezoelectric plate 1 effectively without a leakage of the surface acoustic wave on the inside of nonpiezoelectric plate 1.

If using a material, as nonpiezoelectric plate 1, such that the phase velocity of the surface acoustic wave traveling on nonpiezoelectric plate 1 alone is higher than that traveling on piezoelectric substrate $P_{TX}$ alone, the surface acoustic wave excited in piezoelectric substrate $P_{TX}$ is transmitted to the upper end surface of nonpiezoelectric plate 1 effectively without a leakage of the surface acoustic wave on the inside of nonpiezoelectric plate 1. Accordingly, it is possible to operate the surface acoustic wave touch-position sensing device in FIG. 10 under low power consumption with low voltage, and to support the lower end surface of nonpiezoelectric plate 1.

If using a piezoelectric ceramic having the polarization axis parallel to the thickness direction thereof, as piezoelectric substrate $P_{TX}$, the surface acoustic wave of the first mode and the higher order modes is excited in piezoelectric substrate $P_{TX}$ effectively, and the transducing efficiency from the electric signal $E_T$ to the surface acoustic wave increases.

If using a piezoelectric polymer such as PVDF and so on, as piezoelectric substrate $P_{TX}$, the surface acoustic wave of the first mode and the higher order modes is excited in piezoelectric substrate $P_{TX}$ effectively, and the transducing efficiency from the electric signal $E_T$ to the surface acoustic wave increases. The surface acoustic wave on the upper end surface of nonpiezoelectric plate 1 is transmitted to piezoelectric substrate $P_{RX}$. Interdigital transducer $I_{RX}$ is located so that the surface acoustic wave transmitting direction from interdigital transducer $I_{TXi}$ and the surface acoustic wave receiving direction at interdigital transducer $I_{RX}$ overlap each other. Therefore, the surface acoustic wave, of the first mode and the higher order modes, having the wavelength approximately equal to the interdigital periodicity p of interdigital transducer $I_{RX}$, is transduced to an electric signal $E_R$ with a frequency approximately corresponding to the interdigital periodicity p of interdigital transducer $I_{RX}$, at interdigital transducer $I_{RX}$.

If the phase velocity of the surface acoustic wave of the first mode and the higher order modes is approximately equal to the phase velocity of the Rayleigh wave traveling on nonpiezoelectric plate 1, the transducing efficiency from the surface acoustic wave to the electric signal $E_R$ increases, and in addition, the reflection caused by the miss-matching on the acoustic impedance at the boundary surface between piezoelectric substrate $P_{RX}$ and nonpiezoelectric plate 1 hardly ever causes.

If the thickness d of piezoelectric substrate $P_{RX}$ is smaller than the interdigital periodicity p of interdigital transducer $I_{RX}$, and the thickness of nonpiezoelectric plate 1 is larger than three times the interdigital periodicity p, the surface acoustic wave on the upper end surface of nonpiezoelectric plate 1 is transmitted to piezoelectric substrate $P_{RX}$ effectively without a leakage of the surface acoustic wave on the inside of nonpiezoelectric plate 1. Accordingly, it is possible to operate the surface acoustic wave touch-position sensing device in FIG. 10 under low power consumption with low voltage, and to support the lower end surface of nonpiezoelectric plate 1.

If using a material, as nonpiezoelectric plate 1, such that the phase velocity of the surface acoustic wave traveling on nonpiezoelectric plate 1 alone is higher than that traveling on piezoelectric substrate $P_{RX}$ alone, the surface acoustic wave on the upper end surface of nonpiezoelectric plate 1 is transmitted to piezoelectric substrate $P_{RX}$ effectively without a leakage of the surface acoustic wave on the inside of nonpiezoelectric plate 1.

If using a piezoelectric ceramic having the polarization axis parallel to the thickness direction thereof, as piezoelectric substrate $P_{RX}$, the surface acoustic wave on the upper end surface of nonpiezoelectric plate 1 is transmitted to piezoelectric substrate $P_{RX}$ effectively, and the transducing efficiency from the surface acoustic wave to the electric signal $E_R$ increases.

If using a piezoelectric polymer such as PVDF and so on, as piezoelectric substrate $P_{RX}$, the surface acoustic wave on the upper end surface of nonpiezoelectric plate 1 is transmitted to piezoelectric substrate $P_{RX}$ effectively, and the transducing efficiency from the surface acoustic wave to the electric signal $E_R$ increases.

The electric signal $E_R$ is amplified via amplifier $A_X$. An electric signal ①, which is a part of the amplified electric signal via amplifier $A_X$ and is corresponding to the electric signal $E_T$, is applied to interdigital transducer $I_{TYi}$ via switches $C_{Yi}$. An electric signal ②, which is the remaining part of the amplified electric signal via amplifier $A_X$, is transmitted to controlling system 6 via rectifier 4 and comparator 5. Surface acoustic wave transducing unit Y is equivalent to surface acoustic wave transducing unit X. Thus, when the electric signal $E_T$ is applied to interdigital transducer $I_{TYi}$, the surface acoustic wave, of the first mode and the higher order modes having the wavelength approximately equal to the interdigital periodicity p of interdigital transducer $I_{TYi}$, is excited in piezoelectric substrate $P_{TY}$. The surface acoustic wave in piezoelectric substrate $P_{TY}$ is transmitted to piezoelectric substrate $P_{RY}$ through the upper surface of nonpiezoelectric plate 1. The surface acoustic wave in piezoelectric substrate $P_{RY}$ having the wavelength approximately equal to the interdigital periodicity p of interdigital transducer $I_{RY}$ is transduced to an electric signal $E_R$ with a frequency approximately corresponding to the interdigital periodicity p of interdigital transducer $I_{RY}$, at interdigital transducer $I_{RY}$. The electric signal $E_R$ is amplified via amplifier $A_Y$. An electric signal ③, which is a part of the amplified electric signal via amplifier $A_Y$ is applied to interdigital transducer $I_{TXi}$ via switches $C_{Xi}$. An electric signal ④, which is the remaining part of the amplified electric signal via amplifier $A_Y$, is transmitted to controlling system 6 via rectifier 4 and comparator 5.

In the surface acoustic wave touch-position sensing device in FIG. 10, the first role of controlling system 6 is to turn on and off switches $C_{Xi}$ and $C_{Yi}$ with a fixed period in turn, switches $C_{Xi}$ being closed in turn while one of switches $C_{Yi}$ is closed. The second role is to keep a check on a magnitude of the electric signal $E_R$. The third role is to sense a touch with a finger or others on the touch face by a decrease or a disappearance in magnitude of the electric signal $E_R$. The fourth role is to pick out the switch $C_{Xi}$ closed when a decrease or a disappearance in magnitude of the electric signal $E_R$ happens, and the switch $C_{Yi}$ closed when a decrease or a disappearance in magnitude of the electric signal $E_R$ happens, and then specifying a touch-position, corresponding with the picked out switches $C_{Xi}$ and $C_{Yi}$, on the touch face. Thus, it is possible to specify a touch-position on the touch face. Surface acoustic wave transducing unit X has eight propagation lanes $U_{Xi}$ (i=1, 2, ..., 8) of the surface acoustic wave on the touch face between interdigital transducers $I_{TXi}$ and $I_{RX}$. Surface acoustic wave transducing unit Y has eight propagation lanes $U_{Yi}$ (i=1, 2, ..., 8) of the surface acoustic wave on the touch face between interdigital transducers $I_{TYi}$ and $I_{RY}$. Input terminal of switch $C_{Xi}$ is connected with output terminal of interdigital transducer $I_{RY}$ via amplifier $A_Y$, and input terminal of switch $C_{Yi}$ is connected with output terminal of interdigital transducer $I_{RX}$ via amplifier $A_X$. As a result, switches $C_{Xi}$, propagation lanes $U_{Xi}$ as delay elements, amplifier $A_X$, switches $C_{Yi}$, propagation lanes $U_{Yi}$ as delay elements, and amplifier $A_Y$ form eight oscillators $H_i$ (i=1, 2, ..., 8). Oscillator $H_i$ enables the surface acoustic wave touch-position sensing device in FIG. 10 to have a small-sized circuit with a simple structure. The small-sized circuit causes the surface acoustic wave touch-position sensing device to have a small size which is very light in weight, and to be operated under low power consumption with low voltage. Though each interdigital transducer is located between each piezoelectric substrate and nonpiezoelectric plate 1, each interdigital transducer is able to be located on the upper end surface of each piezoelectric substrate.

Compared with the surface acoustic wave touch-position sensing device in FIG. 10, the surface acoustic wave touch-position sensing device in FIG. 1 can be operated under still lower power consumption owing to the excitation of the unidirectional surface acoustic wave. In addition, no reflection of a surface acoustic wave generates at the side surface of piezoelectric substrate $P_{TX}$ in FIG. 1 because of the excitation of the unidirectional surface acoustic wave. Therefore, the surface acoustic wave touch-position sensing device in FIG. 1 has little or no noise, so that has a still higher sensitivity.

Figure 13:
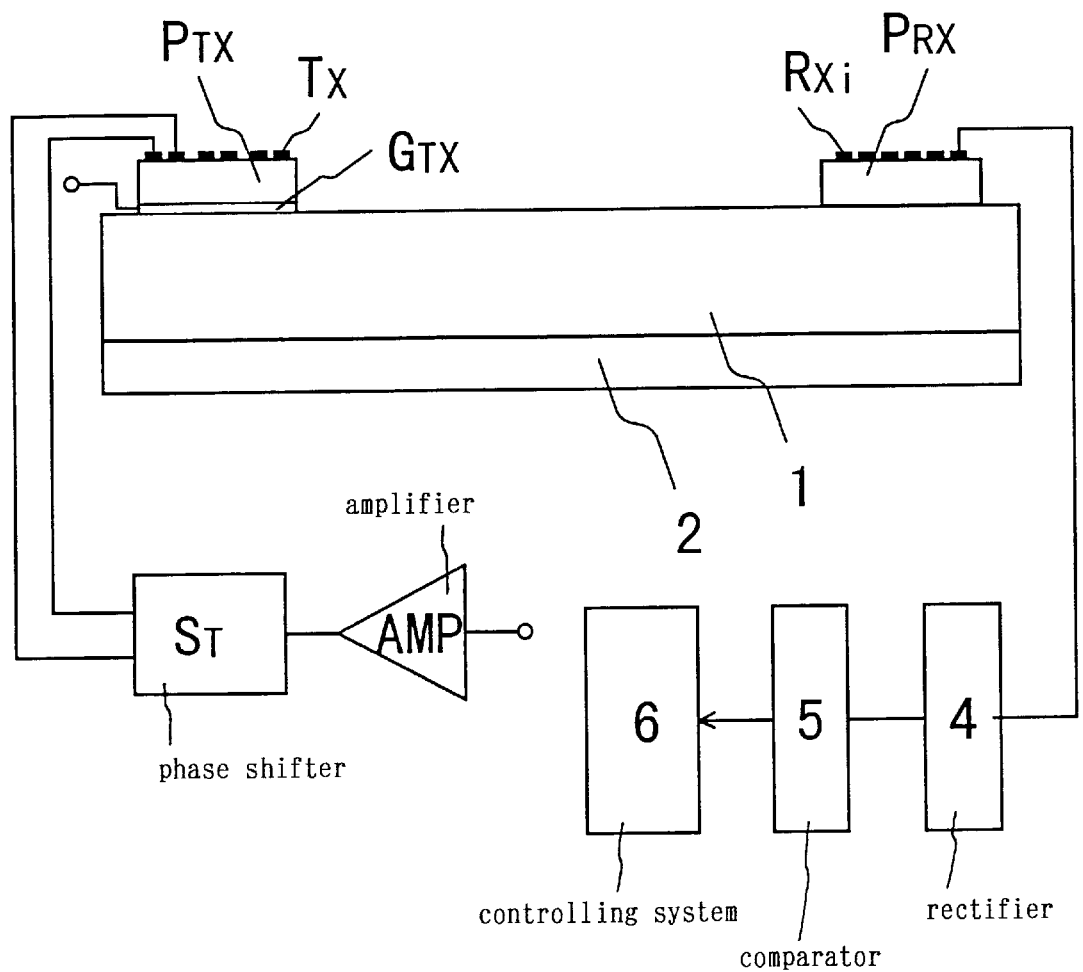
FIG. 13 shows a sectional view of a surface acoustic wave touch-position sensing device according to a third embodiment of the present invention.

FIG. 13 shows a sectional view of a surface acoustic wave touch-position sensing device according to a third embodiment of the present invention. The surface acoustic wave touch-position sensing device in FIG. 13 comprises nonpiezoelectric plate 1, supporting board 2, rectifier 4, comparator 5, controlling system 6, phase shifter $S_T$ including at least a coil $L_1$, amplifier AMP, surface acoustic wave transducing units X and Y. Surface acoustic wave transducing unit X in FIG. 13 comprises piezoelectric substrates $P_{TX}$, $P_{RX}$, interdigital transducer $T_X$ formed on the upper end surface of piezoelectric substrate $P_{TX}$, 16 interdigital transducers $R_{Xi}$ (i=1, 2, ..., 16) formed on the upper end surface of piezoelectric substrate $P_{RX}$, and earth electrode $G_{TX}$ formed on the lower end surface of piezoelectric substrate $P_{TX}$. Surface acoustic wave transducing unit Y in FIG. 13 comprises piezoelectric substrates $P_{TY}$, $P_{RY}$, interdigital transducer $T_Y$ formed on the upper end surface of piezoelectric substrate $P_{TY}$, 16 interdigital transducers $R_i$ (i=1, 2, ..., 16) formed on the upper end surface of piezoelectric substrate $P_{RY}$, earth electrode $G_{TY}$ formed on the lower end surface of piezoelectric substrate $P_{TY}$. FIG. 13 shows only nonpiezoelectric plate 1, supporting board 2, rectifier 4, comparator 5, controlling system 6, phase shifter $S_T$, amplifier AMP and surface acoustic wave transducing unit X. Piezoelectric substrates $P_{TX}$, $P_{TY}$, $P_{RX}$ and $P_{RY}$ are cemented on the upper end surface of nonpiezoelectric plate 1 through an epoxy resin with thickness of about 20 μm. The lower end surface of nonpiezoelectric plate 1 is cemented on supporting board 2.

Figure 14:
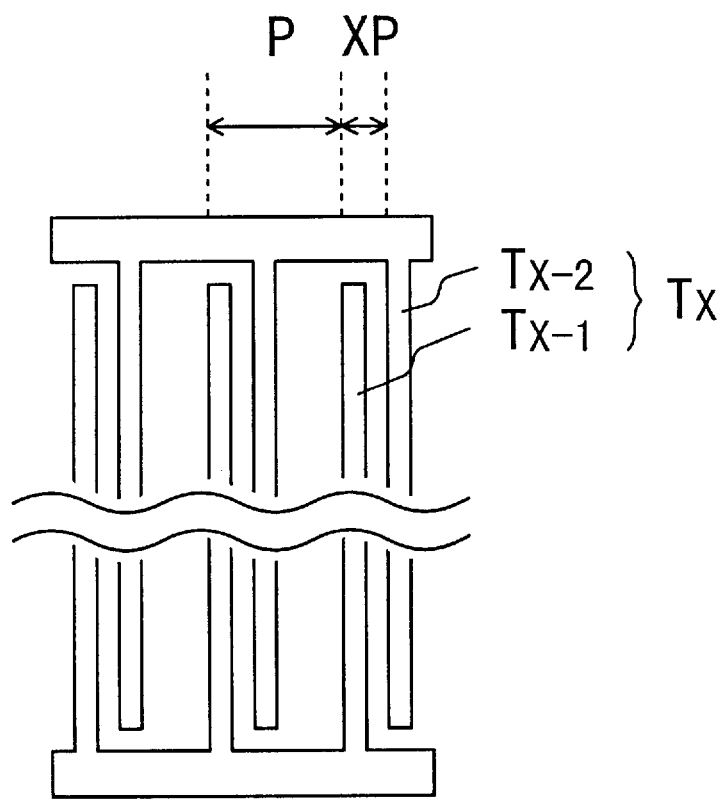
FIG. 14 shows a plan view of interdigital transducer $T_X$ comprising two electrodes $T_{X-1}$ and $T_{X-2}$.

FIG. 14 shows a plan view of interdigital transducer $T_X$ comprising two electrodes $T_{X-1}$, and $T_{X-2}$. Interdigital transducer $T_Y$, comprising two electrodes $T_{Y-1}$, and $T_{Y-2}$, has the same regular-type construction as interdigital transducer $T_X$. Interdigital transducers $T_X$ and $T_Y$, made from aluminium thin film, are mounted on piezoelectric substrates $P_{TX}$ and $P_{TY}$, respectively. Interdigital transducer $T_X$ consisting of ten finger pairs has an interdigital periodicity p of 460 μm, and has two kinds of distances between one electrode finger and two neighboring electrode fingers, the shorter distance xp being 115 μm.

Figure 15:
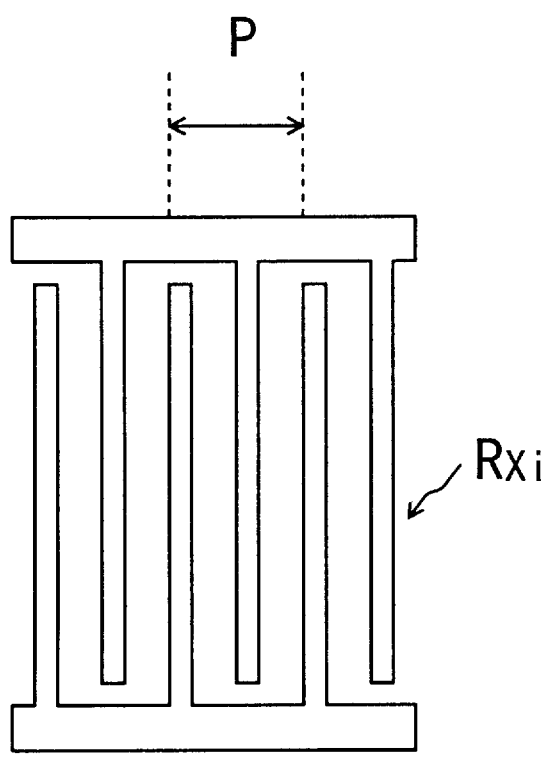
FIG. 15 shows a plan view of interdigital transducer $R_{Xi}$ consisting of ten finger pairs and having an interdigital periodicity p of 460 µm.

FIG. 15 shows a plan view of interdigital transducer $R_{Xi}$ consisting of ten finger pairs and having an interdigital periodicity p of 460 μm. Interdigital transducer $R_{Yi}$ has the same regular-type construction as interdigital transducer $R_{Xi}$. Interdigital transducers $R_{Xi}$ and $R_{Yi}$, made from aluminium thin film, are mounted on piezoelectric substrates $P_{RX}$ and $R_{Yi}$, respectively.

Figure 16:
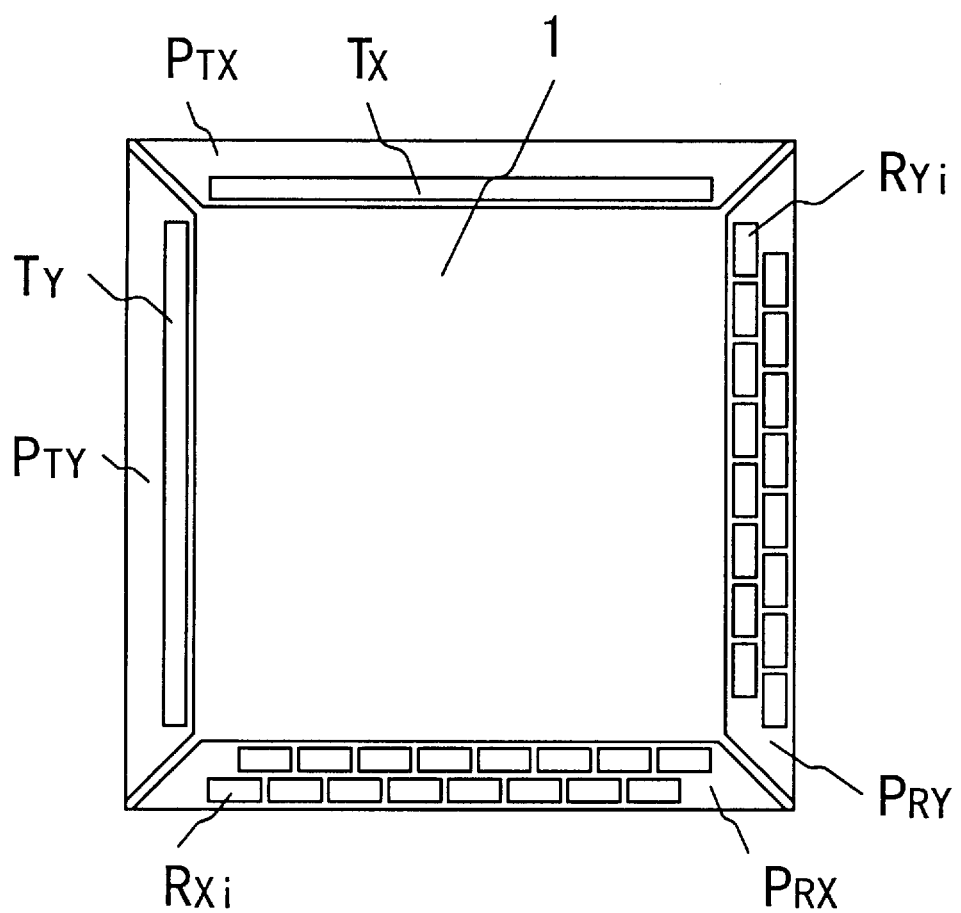
FIG. 16 shows a plan view of the surface acoustic wave touch-position sensing device in FIG. 13.

FIG. 16 shows a plan view of the surface acoustic wave touch-position sensing device in FIG. 13. FIG. 16 shows only nonpiezoelectric plate 1, piezoelectric substrates $P_{TX}$, $P_{TY}$, $P_{RX}$, $P_{RY}$, interdigital transducers $T_X$, $T_Y$, $R_{Xi}$ and $R_{Yi}$.

Figure 17:
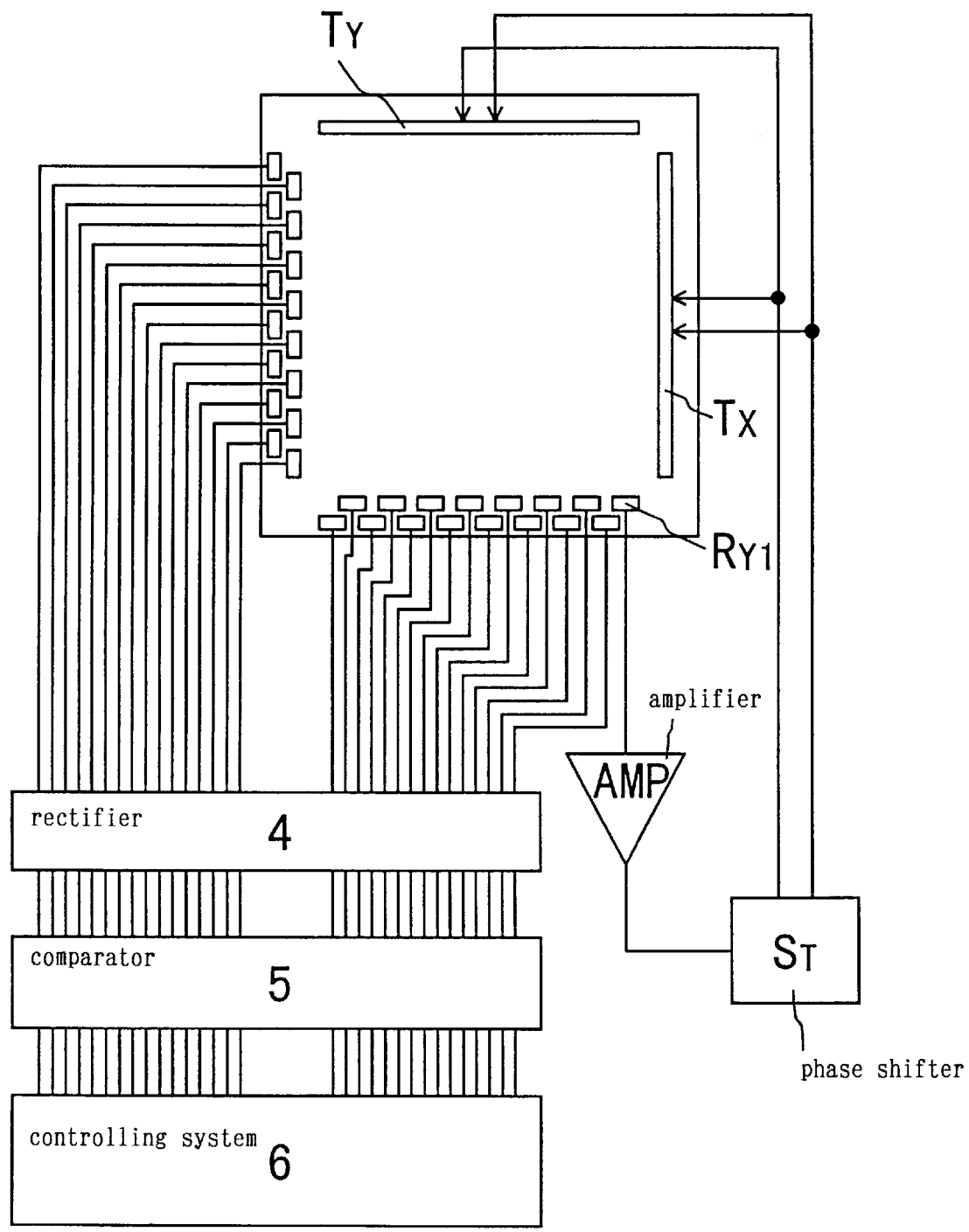
FIG. 17 shows a diagram of a driving circuit of the surface acoustic wave touch-position sensing device in FIG. 13.

FIG. 17 shows a diagram of a driving circuit of the surface acoustic wave touch-position sensing device in FIG. 13. Interdigital transducer $R_{Yi}$ of interdigital transducers $R_{Yi}$ is connected with amplifier AMP. An output terminal of phase shifter $S_T$ is connected with input terminals of electrodes $T_{X-1}$, and $T_{Y-1}$. The other output terminal of phase shifter $S_T$ is connected with input terminals of electrodes $T_{X-2}$ and $T_{Y-2}$.

When operating the surface acoustic wave touch-position sensing device in FIG. 13, two electric signals $E_{T1}$ and $E_{T2}$, with the phase difference 90° or −270° and having a frequency approximately corresponding to the interdigital periodicity p of interdigital transducer $T_X$, are applied between electrode $T_{X-1}$ and earth electrode $G_{TX}$, and between electrode $T_{X-2}$ and earth electrode $G_{TX}$, respectively, via phase shifter $S_T$. In this time, the unidirectional surface acoustic wave, of the first mode and the higher order modes having the wavelength approximately equal to the interdigital periodicity p of interdigital transducer $T_X$, is excited in piezoelectric substrate $P_{TX}$. The unidirectional surface acoustic wave excited in piezoelectric substrate $P_{TX}$ is transmitted to the upper end surface of nonpiezoelectric plate 1, and then transmitted to piezoelectric substrate $P_{RX}$ through the upper end surface of nonpiezoelectric plate 1. Interdigital transducer $R_{Xi}$ is located so that the surface acoustic wave transmitting direction from interdigital transducer $T_X$ and the surface acoustic wave receiving direction at interdigital transducer $R_{Xi}$ overlap each other, as shown in FIG. 16. Therefore, the surface acoustic wave in piezoelectric substrate $P_{Rx}$ having the wavelength approximately equal to the interdigital periodicity p of interdigital transducer $R_{Xi}$ is transduced to each electric signal $E_{Ri}$ (i=1, 2, ..., 16) with a frequency approximately corresponding to the interdigital periodicity p of interdigital transducer $R_{Xi}$, at interdigital transducer $R_{Xi}$. The electric signals $E_{Ri}$ are transmitted to controlling system 6 via rectifier 4 and comparator 5. Surface acoustic wave transducing unit Y is equivalent to surface acoustic wave transducing unit X. Thus, when the electric signals $E_{T1}$ and $ET_2$ with the phase difference 90° or −270° are applied between electrode $T_{Y-1}$ and earth electrode $G_{TY}$, and between electrode $T_{Y-2}$ and earth electrode $G_{TY}$, respectively, via phase shifter $S_T$, the unidirectional surface acoustic wave of the first mode and the higher order modes is excited in piezoelectric substrate $P_{TY}$. The unidirectional surface acoustic wave excited in piezoelectric substrate $P_{TY}$ is transmitted to the upper end surface of nonpiezoelectric plate 1, and then transmitted to piezoelectric substrate $P_{RY}$ through the upper end surface of nonpiezoelectric plate 1. The surface acoustic wave in piezoelectric substrate $P_{RY}$ is transduced to each electric signal $E_{Ri}$ (i=1, 2, ..., 16) at interdigital transducer $R_{Yi}$. Thus, interdigital transducers $T_Y$ and $R_{Yi}$ form 16 propagation lanes $U_{Yi}$ (i=1, 2, ..., 16) of the surface acoustic wave, and interdigital transducers $T_X$ and $R_{Xi}$ form 16 propagation lanes $U_{Xi}$ (i=1, 2, ..., 16) of the surface acoustic wave. The electric signals $E_{Ri}$, except the electric signal $E_{R1}$, are transmitted to controlling system 6 via rectifier 4 and comparator 5. The electric signal $E_{R1}$ at interdigital transducer $R_{Y1}$, is amplified via amplifier AMP, and then applied to interdigital transducers $T_X$ and $T_Y$ again, via phase shifter $S_T$. Thus, interdigital transducers $T_Y$, a propagation lane $U_{Y1}$ of the surface acoustic wave between interdigital transducers $T_Y$ and $R_{Y1}$, interdigital transducer $R_{Y1}$, amplifier AMP and phase shifter $S_T$ form an oscillator $H_1$. Oscillator $H_1$ enables the surface acoustic wave touch-position sensing device in FIG. 13 to have a small-sized circuit with a simple structure. The small-sized circuit causes the surface acoustic wave touch-position sensing device to have a small size which is very light in weight, and to be operated under low power consumption with low voltage.

In the surface acoustic wave touch-position sensing device in FIG. 13, the first role of controlling system 6 is to keep a check on a magnitude of the electric signal $E_{Ri}$. The second role is to sense a touch with a finger or others on the touch face by a decrease or a disappearance in magnitude of the electric signal $E_{Ri}$. The third role is to pick out one of interdigital transducers $R_{Xi}$ corresponding to the decrease or the disappearance in magnitude of the electric signal $E_{Ri}$, and one of interdigital transducers $R_{Yi}$ corresponding to the decrease or the disappearance in magnitude of the electric signal $E_{Ri}$. If touching a crossing point of propagation lanes $U_{Xi}$ and $U_{Yi}$ (without $U_{Y1}$) on the touch face with a pen, the surface acoustic wave is intercepted at the crossing point. Therefore, the magnitude of the electric signal $E_{Ri}$ at interdigital transducer $R_{Xi}$ and the magnitude of the electric signal $E_{Ri}$ at interdigital transducer $R_{Yi}$ decrease or disappear. Thus, it is possible to sense a touch with the pen on the touch face, moreover, to specify a touch-position corresponding to the crossing point with a high sensitivity and a quick response time. If touching, for example, a crossing point of propagation lanes $U_{X6}$ and $U_{Y2}$, a decrease or a disappearance in magnitude of the electric signal $E_{R6}$ at interdigital transducer $R_{X6}$ and a decrease or a disappearance in magnitude of the electric signal $E_{R2}$ at interdigital transducer $R_{Y2}$ happen. Thus, it is possible to specify a touch-position on the touch face by picking out one of interdigital transducers $R_{Xi}$ corresponding to a decrease or a disappearance in magnitude of the electric signal $E_{Ri}$, and one of interdigital transducers $R_{Yi}$ corresponding to a decrease or a disappearance in magnitude of the electric signal $E_{Ri}$.

In FIG. 16, two neighbors of propagation lanes $U_{Xi}$ are partially overlapping each other, and two neighbors of propagation lanes $U_{Yi}$ are also partially overlapping each other. If touching, for example, an overlapping area of propagation lanes $U_{X5}$ and $U_{X6}$ on the touch face, both the electric signal $E_{R5}$ at interdigital transducer $Rx_5$ and the electric signal $E_{R6}$ at interdigital transducer $R_{X6}$ decrease. Thus, it is possible to specify a touch-position on an overlapping area of two propagation lanes $U_{Xi}$ on the touch face by picking out two neighboring interdigital transducers $R_{Xi}$ at which the electric signals $E_{Ri}$ decrease. In the same way, a touch-position on an overlapping area of two propagation lanes $U_{Yi}$ on the touch face is specified.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A surface acoustic wave touch-position sensing device comprising:

at least two surface acoustic wave transducing units X and Y, each thereof consisting of
a piezoelectric substrate $P_T$ having two end surfaces running perpendicular to the direction of the thickness d thereof, a piezoelectric substrate $P_R$ having two end surfaces running perpendicular to the direction of the thickness d thereof, N interdigital transducers $I_{Ti}$ (i=1, 2, ..., N) formed on one end surface of said piezoelectric substrate $P_T$, said thickness d of said piezoelectric substrate $P_T$ being smaller than an interdigital periodicity p of each interdigital transducer $I_{Ti}$, an interdigital transducer $I_R$ formed on one end surface of said piezoelectric substrate $P_R$ and having an interdigital periodicity equal to said interdigital periodicity p, said thickness d of said piezoelectric substrate $P_R$ being smaller than said interdigital periodicity p, and N switches $C_i$ (i=1, 2, ..., N), an output terminal of each thereof being connected with an input terminal of each of said interdigital transducers $I_{Ti}$;

a nonpiezoelectric plate having an upper- and a lower end surfaces running perpendicular to the thickness direction thereof, the thickness of said nonpiezoelectric plate being larger than three times said interdigital periodicity p, said piezoelectric substrates $P_T$ and $P_R$ being mounted on said upper end surface of said nonpiezoelectric plate; and a controlling system connected with said surface acoustic wave transducing units X and Y, said interdigital transducer $I_{Ti}$ receiving an electric signal $E_T$ with a frequency approximately corresponding to said interdigital periodicity p, exciting the surface acoustic wave of the first mode and the higher order modes in said piezoelectric substrate $P_T$, and transmitting said surface acoustic wave having the wavelength approximately equal to said interdigital periodicity p to said piezoelectric substrate $P_R$ through said upper end surface of said nonpiezoelectric plate, the phase velocity of said surface acoustic wave of said first mode and said higher order modes being approximately equal to the phase velocity of the Rayleigh wave traveling on said nonpiezoelectric plate alone, said interdigital transducer $I_R$ transducing said surface acoustic wave in said piezoelectric substrate $P_R$ to an electric signal $E_R$ with a frequency approximately corresponding to said interdigital periodicity p, said nonpiezoelectric plate being made of a material such that the phase velocity of the surface acoustic wave traveling on said nonpiezoelectric plate alone is higher than that traveling on said piezoelectric substrates $P_T$ and $P_R$ alone, said controlling system turning on and off said switches $C_i$ with a fixed period in turn, keeping a check on a magnitude of said electric signal $E_R$, sensing a touch with a finger or others on said upper end surface of said nonpiezoelectric plate by a decrease or a disappearance in magnitude of said electric signal $E_R$, picking out one of said switches $C_i$ turned on when said decrease or said disappearance in magnitude of said electric signal $E_R$ happens, said surface acoustic wave transducing unit X having N propagation lanes $U_{Xi}$ (i=1, 2, ..., N) of said surface acoustic wave between said interdigital transducers $I_{Ti}$ and $I_R$, two neighbors of said propagation lanes $U_{Xi}$ being closed or partially overlapping each other, said surface acoustic wave transducing unit Y having N propagation lanes $U_{Yi}$ (i=1, 2, ..., N) of said surface acoustic wave between said interdigital transducers $I_{Ti}$ and $I_R$, two neighbors of said propagation lanes $U_{Yi}$ being closed or partially overlapping each other, said propagation lanes $U_{Xi}$ being vertical to said propagation lanes $U_{Yi}$.

2. A surface acoustic wave touch-position sensing device as defined in claim 1 further comprising:

an amplifier $A_X$, an input terminal of said switch $C_i$ in said surface acoustic wave transducing unit Y being connected with an output terminal of said interdigital transducer $I_R$ in said surface acoustic wave transducing unit X via said amplifier $A_X$; and an amplifier $A_Y$, an input terminal of said switch $C_i$ in said surface acoustic wave transducing unit X being connected with an output terminal of said interdigital transducer $I_R$ in said surface acoustic wave transducing unit Y via said amplifier $A_Y$, said switches $C_i$ in said surface acoustic wave transducing unit X, said propagation lanes $U_{Xi}$ as delay elements, said amplifier $A_X$, said switches $C_i$ in said surface acoustic wave transducing unit Y, said propagation lanes $U_{Yi}$ as delay elements, and said amplifier $A_Y$ forming N oscillators $H_i$ (i=1, 2, ..., N).

3. A surface acoustic wave touch-position sensing device as defined in claim 1 further comprising a supporting board cemented to said lower end surface of said nonpiezoelectric plate.

4. A surface acoustic wave touch-position sensing device as defined in claim 1, wherein each of said piezoelectric substrates $P_T$ and $P_R$ is made of a piezoelectric ceramic, the polarization axis thereof being parallel to the thickness direction thereof.

5. A surface acoustic wave touch-position sensing device as defined in claim 1, wherein each of said piezoelectric substrates $P_T$ and $P_R$ is made of a piezoelectric polymer.

6. A surface acoustic wave touch-position sensing device comprising:

at least two surface acoustic wave transducing units X and Y, each thereof consisting of a piezoelectric substrate $P_T$ having an upper- and a lower end surfaces running perpendicular to the direction of the thickness d thereof, a piezoelectric substrate $P_R$ having an upper- and a lower end surfaces running perpendicular to the direction of the thickness d thereof, N interdigital transducers $T_i$ (i=1, 2, ..., N) formed on said upper end surface of said piezoelectric substrate $P_T$, each interdigital transducer $T_i$ consisting of two electrodes $T_{i\text{-}1}$ and $T_{i\text{-}2}$ and having two kinds of distances between one electrode finger of said electrode $T_{i\text{-}1}$ and two neighboring electrode fingers of said electrode $T_{i\text{-}2}$, said thickness d of said piezoelectric substrate $P_T$ being smaller than an interdigital periodicity p of said interdigital transducer $T_i$, an interdigital transducer R, formed on said upper end surface of said piezoelectric substrate $P_R$, consisting of two electrodes $R_{\text{-}1}$ and $R_{\text{-}2}$, having two kinds of distances between one electrode finger of said electrode $R_{\text{-}1}$ and two neighboring electrode fingers of said electrode $R_{\text{-}2}$, and having an interdigital periodicity equal to said interdigital periodicity p, said thickness d of said piezoelectric substrate $P_R$ being smaller than said interdigital periodicity p, N earth electrodes $G_{Ti}$ (i=1, 2, ..., N) formed on said lower end surface of said piezoelectric substrate $P_T$, an earth electrode $G_R$ formed on said lower end surface of said piezoelectric substrate $P_R$, a phase shifter $S_T$ including at least a coil $L_1$, a phase shifter $S_R$ including at least a coil $L_2$, and N pairs of switches $W_i$ (i=1, 2,..., N), each pair of switches $W_i$ consisting of two switches $W_{i-1}$ and $W_{i-2}$, output terminals of said switches $W_{i-1}$ and $W_{i-2}$ being connected with input terminals of said electrodes $T_{i-1}$ and $T_{i-2}$, respectively;

a nonpiezoelectric plate having an upper- and a lower end surfaces running perpendicular to the thickness direction thereof, the thickness of said nonpiezoelectric plate being larger than three times said interdigital periodicity p, said piezoelectric substrates $P_T$ and $P_R$ being mounted on said upper end surface of said nonpiezoelectric plate through said earth electrodes $G_{Ti}$ and $G_R$, respectively; and a controlling system connected with said surface acoustic wave transducing units X and Y, said interdigital transducer $T_i$ and said earth electrode $G_{Ti}$ receiving an electric signal $E_{T1}$ between said electrode $T_{i-1}$ and said earth electrode $G_{Ti}$, and an electric signal $E_{T2}$ between said electrode $T_{i-2}$ and said earth electrode $G_{Ti}$ via said phase shifter $S_T$, exciting a surface acoustic wave of the first mode and the higher order modes in said piezoelectric substrate $P_T$, and transmitting said surface acoustic wave having the wavelength approximately equal to said interdigital periodicity p to said piezoelectric substrate $P_R$ through said upper end surface of said nonpiezoelectric plate, the phase velocity of said surface acoustic wave of said first mode and said higher order modes being approximately equal to the phase velocity of the Rayleigh wave traveling on said nonpiezoelectric plate alone, each of said electric signals $E_{T1}$ and $E_{T2}$ having a frequency approximately corresponding to said interdigital periodicity p, the phase difference between said electric signals $E_{T1}$ and $E_{T2}$ being $2\pi y$, said interdigital transducer R and said earth electrode $G_R$ transducing said surface acoustic wave in said piezoelectric substrate $P_R$, with wavelength approximately equal to said interdigital periodicity p, to an electric signal $E_{R1}$ between said electrode $R_{-1}$ and said earth electrode $G_R$, and an electric signal $E_{R2}$ between said electrode $R_{-2}$ and said earth electrode $G_R$, each of said electric signals $E_{R1}$ and $E_{R2}$ having a frequency approximately corresponding to said interdigital periodicity p, the phase difference between said electric signals $E_{R1}$ and $E_{R2}$ being $2\pi y$, said phase shifter $S_R$ combining said electric signals $E_{R1}$ and $E_{R2}$, and delivering a combined electric signal $E_R$, said nonpiezoelectric plate being made of a material such that the phase velocity of the surface acoustic wave traveling on said nonpiezoelectric plate alone is higher than that traveling on said piezoelectric substrates $P_T$ and $P_R$ alone, said controlling system turning on and off said pairs of switches $W_i$ with a fixed period in turn, keeping a check on a magnitude of said electric signal $E_R$, sensing a touch with a finger or others on said upper end surface of said nonpiezoelectric plate by a decrease or a disappearance in magnitude of said electric signal $E_R$, picking out said pair of switches $W_i$ turned on when said decrease or said disappearance in magnitude of said electric signal $E_R$ happens, said surface acoustic wave transducing unit X having N propagation lanes $U_{Xi}$ (i=1, 2, ..., N) of said surface acoustic wave between said interdigital transducers $T_i$ and R, two neighbors of said propagation lanes $U_{Xi}$ being closed or partially overlapping each other, said surface acoustic wave transducing unit Y having N propagation lanes $U_{Yi}$ (i=1, 2, ..., N) of said surface acoustic wave between said interdigital transducers $T_i$ and R, two neighbors of said propagation lanes $U_{Yi}$ being closed or partially overlapping each other, said propagation lanes $U_{Xi}$ being vertical to said propagation lanes $U_{Yi}$.

7. A surface acoustic wave touch-position sensing device as defined in claim 6, wherein x<½ in a shorter distance xp of said two kinds of distances between one electrode finger of said electrode $T_{i-1}$ and two neighboring electrode fingers of said electrode $T_{i-2}$, x<½ in a shorter distance xp of said two kinds of distances between one electrode finger of said electrode $R_{-1}$ and two neighboring electrode fingers of said electrode $R_{-2}$, x+y=±½ in said phase difference $2\pi y$ between said electric signals $E_{T1}$ and $E_{T2}$, and x+y=+±½ in said phase difference $2\pi y$ between said electric signals $E_{R1}$ and $E_{R2}$.

8. A surface acoustic wave touch-position sensing device as defined in claim 6 further comprising:

an amplifier $A_X$, an input terminal of said phase shifter $S_T$ in said surface acoustic wave transducing unit Y being connected with an output terminal of said phase shifter $S_R$ in said surface acoustic wave transducing unit X via said amplifier $A_X$; and an amplifier $A_Y$, an input terminal of said phase shifter $S_T$ in said surface acoustic wave transducing unit X being connected with an output terminal of said phase shifter $S_R$ in said surface acoustic wave transducing unit Y via said amplifier $A_Y$, said phase shifter $S_T$ in said surface acoustic wave transducing unit X, said pairs of switches $W_i$ in said surface acoustic wave transducing unit X, said propagation lanes $U_{Xi}$ as delay elements, said phase shifter $S_R$ in said surface acoustic wave transducing unit X, said amplifier $A_X$, said phase shifter $S_T$ in said surface acoustic wave transducing unit Y, said pairs of switches $W_i$ in said surface acoustic wave transducing unit Y, said propagation lanes $U_{Yi}$ as delay elements, said phase shifter $S_R$ in said surface acoustic wave transducing unit Y, and said amplifier $A_Y$ forming N oscillators $H_i$ (i=1, 2, ..., N).

9. A surface acoustic wave touch-position sensing device as defined in claim 6 further comprising a supporting board cemented to said lower end surface of said nonpiezoelectric plate.

10. A surface acoustic wave touch-position sensing device as defined in claim 6, wherein each of said piezoelectric substrates $P_T$ and $P_R$ is made of a piezoelectric ceramic, the polarization axis thereof being parallel to the thickness direction thereof.

11. A surface acoustic wave touch-position sensing device as defined in claim 6, wherein each of said piezoelectric substrates $P_T$ and $P_R$ is made of a piezoelectric polymer.

12. A surface acoustic wave touch-position sensing device comprising:

at least two surface acoustic wave transducing units X and Y, each thereof consisting of a piezoelectric substrate $P_T$ having an upper- and a lower end surfaces running perpendicular to the direction of the thickness d thereof, a piezoelectric substrate $P_R$ having an upper- and a lower end surfaces running perpendicular to the direction of the thickness d thereof, an interdigital transducer T, formed on said upper end surface of said piezoelectric substrate $P_T$, consisting of two electrodes $T_{-1}$ and $T_{-2}$ and having two kinds of distances between one electrode finger of said electrode $T_{-1}$ and two neighboring electrode fingers of said electrode $T_{-2}$, said thickness d of said piezoelectric substrate $P_T$ being smaller than an interdigital periodicity p of said interdigital transducer T, N interdigital transducers $R_i$ (i=1, 2. . . , N) formed on said upper end surface of said piezoelectric substrate $P_R$, each interdigital transducer $R_i$ having an interdigital periodicity equal to said interdigital periodicity p, said thickness d of said piezoelectric substrate $P_R$ being smaller than said interdigital periodicity p, and an earth electrode $G_T$ formed on said lower end surface of said piezoelectric substrate $P_T$;

a nonpiezoelectric plate having an upper- and a lower end surfaces running perpendicular to the thickness direction thereof, the thickness of said nonpiezoelectric plate being larger than three times said interdigital periodicity p, said piezoelectric substrates $P_T$ and $P_R$ being mounted on said upper end surface of said nonpiezoelectric plate through said lower end surfaces of said piezoelectric substrates $P_T$ and $P_R$, respectively;

a phase shifter $S_T$ including at least a coil $L_1$; and a controlling system connected with said two surface acoustic wave transducing units X and Y, said interdigital transducer T and said earth electrode $G_T$ receiving an electric signal $E_{T1}$ between said electrode $T_{-1}$ and said earth electrode $G_T$, and an electric signal $E_{T2}$ between said electrode $T_{-2}$ and said earth electrode $G_T$ via said phase shifter $S_T$, exciting a surface acoustic wave of the first mode and the higher order modes in said piezoelectric substrate $P_T$, and transmitting said surface acoustic wave having the wavelength approximately equal to said interdigital periodicity p to said piezoelectric substrate $P_R$ through said upper end surface of said nonpiezoelectric plate, the phase velocity of said surface acoustic wave of said first mode and said higher order modes being approximately equal to the phase velocity of the Rayleigh wave traveling on said nonpiezoelectric plate alone, each of said electric signals $E_{T1}$ and $E_{T2}$ having a frequency approximately corresponding to said interdigital periodicity p, the phase difference between said electric signals $E_{T1}$ and $E_{T2}$ being $2\pi y$, said interdigital transducer $R_i$ transducing said surface acoustic wave in said piezoelectric substrate $P_R$, with wavelength approximately equal to said interdigital periodicity p, to electric signals $E_{Ri}$ (i=1, 2,. . . , N), said signal $E_{Ri}$ having a frequency approximately corresponding to said interdigital periodicity p, said nonpiezoelectric plate being made of a material such that the phase velocity of the surface acoustic wave traveling on said nonpiezoelectric plate alone is higher than that traveling on said piezoelectric substrates $P_T$ and $P_R$ alone, said controlling system keeping a check on a magnitude of said electric signals $E_{Ri}$, sensing a touch with a finger or others on the other end surface of said nonpiezoelectric plate by a decrease or a disappearance in magnitude of said electric signals $E_{Ri}$, picking out at least one of said interdigital transducers $R_i$ corresponding to said decrease or said disappearance in magnitude of said electric signals $E_{Ri}$, said surface acoustic wave transducing unit X having N propagation lanes $U_{Xi}$ (i=1, 2, . . . , N) of said surface acoustic wave between said interdigital transducers T and $R_i$, two neighbors of said propagation lanes $U_{Xi}$ being closed or partially overlapping each other, said surface acoustic wave transducing unit Y having N propagation lanes $U_{Yi}$ (i=1, 2, . . . , N) of said surface acoustic wave between said interdigital transducers T and $R_i$, two neighbors of said propagation lanes $U_{Yi}$ being closed or partially overlapping each other, said propagation lanes $U_{Xi}$ being vertical to said propagation lanes $U_{Yi}$.

13. A surface acoustic wave touch-position sensing device as defined in claim 12, wherein x<½ in a shorter distance xp of said two kinds of distances between one electrode finger of said electrode $T_{-1}$ and two neighboring electrode fingers of said electrode $T_{-2}$, and x+y=±½ in said phase difference $2\pi y$ between said electric signals $E_{T1}$ and $E_{T2}$.

14. A surface acoustic wave touch-position sensing device as defined in claim 12 further comprising an amplifier AMP, two output terminals of said phase shifter $S_T$ being connected with input terminals of said electrodes $T_{-1}$, and $T_{-2}$, respectively, an input terminal of said phase shifter $S_T$ being connected with an interdigital transducers $R_1$ of said interdigital transducers $R_i$ in said surface acoustic wave transducing unit Y, via said amplifier AMP, said interdigital transducer T in said surface acoustic wave transducing unit Y, a propagation lane $U_{Yi}$, as a delay element, of said surface acoustic wave between said interdigital transducers T and $R_1$ in said surface acoustic wave transducing unit Y, said interdigital transducer $R_1$, said amplifier AMP and said phase shifter $S_T$ forming an oscillator $H_1$.

15. A surface acoustic wave touch-position sensing device as defined in claim 12 further comprising a supporting board cemented to said lower end surface of said nonpiezoelectric plate.

16. A surface acoustic wave touch-position sensing device as defined in claim 12, wherein each of said piezoelectric substrates $P_T$ and $P_R$ is made of a piezoelectric ceramic, the polarization axis thereof being parallel to the thickness direction thereof.

17. A surface acoustic wave touch-position sensing device as defined in claim 12, wherein each of said piezoelectric substrates $P_T$ and $P_R$ is made of a piezoelectric polymer.

* * * * *